April 2, 1957 W. E. PEERY 2,787,654

ELECTRONIC PHOTO-TYPECOMPOSING SYSTEM

Filed July 29, 1948 14 Sheets-Sheet 1

INVENTOR.
WALTER E. PEERY
BY
Campbell, Brumbaugh, Free & Graves
ATTORNEYS

INVENTOR.
WALTER E. PEERY
BY
Campbell, Brumbaugh, Free & Graves
ATTORNEYS

April 2, 1957 W. E. PEERY 2,787,654

ELECTRONIC PHOTO-TYPECOMPOSING SYSTEM

Filed July 29, 1948 14 Sheets-Sheet 3

INVENTOR.
WALTER E. PEERY
BY
Campbell, Brumbaugh, Free & Graves
ATTORNEYS

April 2, 1957 W. E. PEERY 2,787,654

ELECTRONIC PHOTO-TYPECOMPOSING SYSTEM

Filed July 29, 1948 14 Sheets-Sheet 4

INVENTOR.
WALTER E. PEERY
BY
Campbell, Brumbaugh, Free & Graves
ATTORNEYS

April 2, 1957 W. E. PEERY 2,787,654

ELECTRONIC PHOTO-TYPECOMPOSING SYSTEM

Filed July 29, 1948 14 Sheets-Sheet 5

INVENTOR.
WALTER E. PEERY
BY
Campbell, Brumbaugh, Free & Graves
ATTORNEYS

April 2, 1957 W. E. PEERY 2,787,654
ELECTRONIC PHOTO-TYPECOMPOSING SYSTEM
Filed July 29, 1948 14 Sheets-Sheet 6
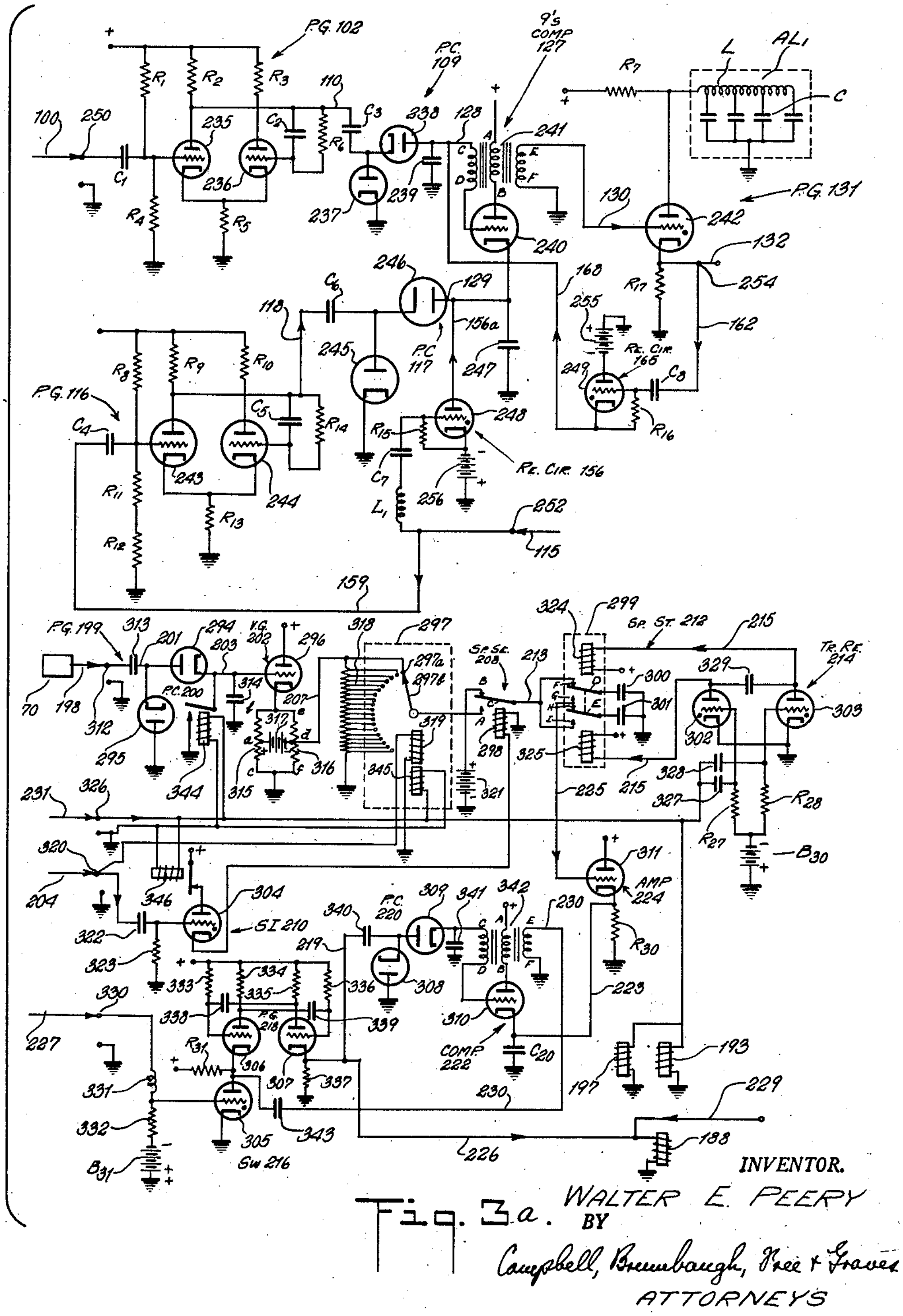
INVENTOR.
Fig. 3a. WALTER E. PEERY
BY
Campbell, Brumbaugh, Free & Graves
ATTORNEYS

ELECTRONIC PHOTO-TYPECOMPOSING SYSTEM

INVENTOR.
WALTER E. PEERY
BY
Campbell, Brumbaugh, Free & Graves
ATTORNEYS

April 2, 1957 W. E. PEERY 2,787,654

ELECTRONIC PHOTO-TYPECOMPOSING SYSTEM

Filed July 29, 1948 14 Sheets-Sheet 8

INVENTOR.
WALTER E. PEERY
BY
Campbell, Brumbaugh, Free & Graves
ATTORNEYS

ELECTRONIC PHOTO-TYPECOMPOSING SYSTEM

Filed July 29, 1948 14 Sheets-Sheet 9

INVENTOR.
WALTER E. PEERY
BY
Campbell, Brumbaugh, Free & Graves
ATTORNEYS

INVENTOR.
WALTER E. PEERY
BY
Campbell, Brumbaugh, Free & Graves
ATTORNEYS

INVENTOR.
WALTER E. PEERY
BY
Campbell, Brumbaugh, Free & Graves
ATTORNEYS

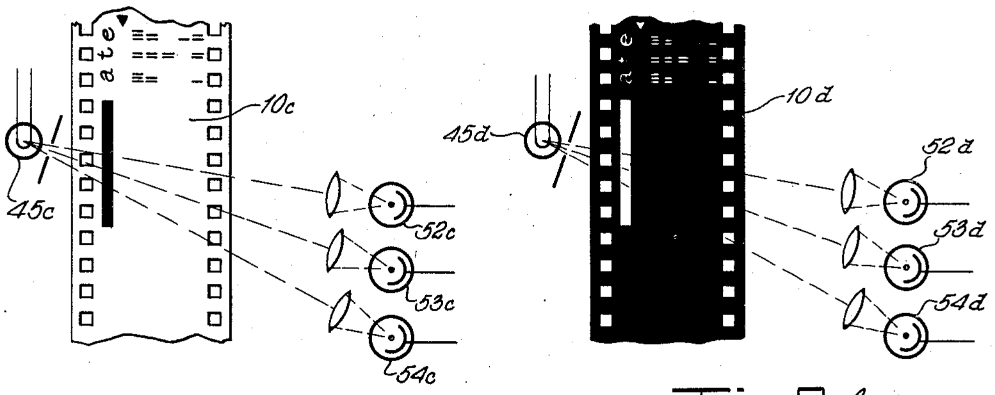
Fig. 9.a Fig. 9.b
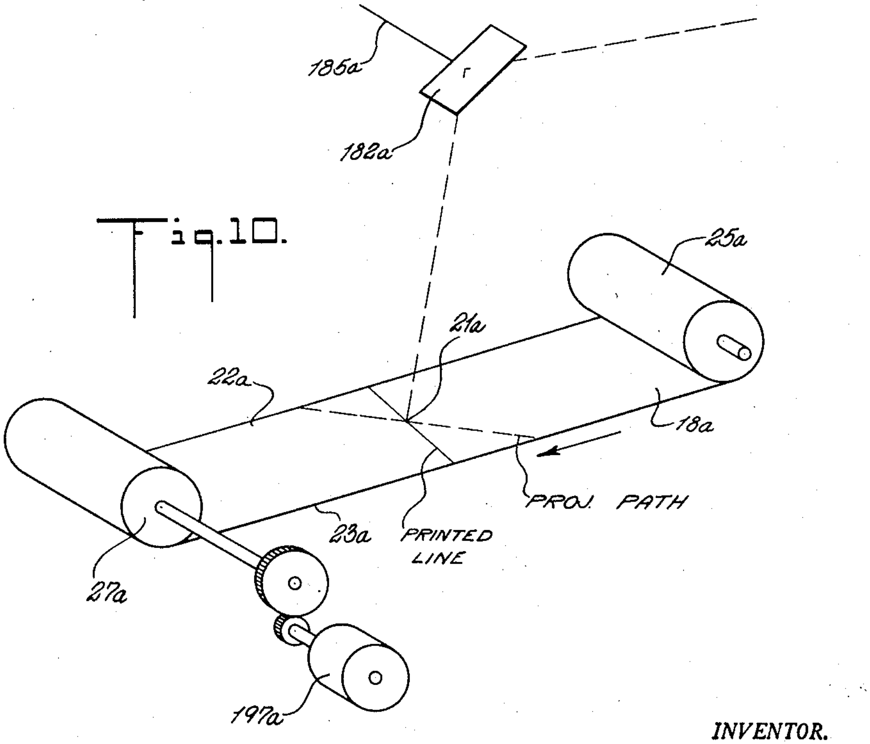
Fig. 10.
INVENTOR.
WALTER E. PEERY
BY
Campbell, Brumbaugh, Free & Graves
ATTORNEYS INVENTOR.
WALTER E. PEERY
BY
Campbell, Brumbaugh, Free & Graves
ATTORNEYS

ELECTRONIC PHOTO-TYPECOMPOSING SYSTEM

Filed July 29, 1948

INVENTOR.
WALTER E. PEERY
BY
Campbell, Brumbaugh, Free & Graves
ATTORNEYS

United States Patent Office 2,787,654

Patented Apr. 2, 1957

2,787,654

ELECTRONIC PHOTO-TYPECOMPOSING SYSTEM

Walter E. Peery, Morristown, N. J.

Application July 29, 1948, Serial No. 41,318

38 Claims. (Cl. 178—2)

This invention relates generally to the art of printing and more particularly to new and improved phototypographic apparatus. It also relates generally to the field of radio and wire communication and more specifically to automatic message sending and writing machines in which phototypographic apparatus of the above character may be employed.

In offset printing or in printing processes involving photographically prepared plates containing text, the commonly used present art requires that the type be set by hand or by machine just as if the type so set were to be used directly in the printing process. When a column or page of type has been set a proof of the type is carefully prepared and the block of set type is thrown back into the type cases or into the melting pot to be used again. The proof copy is taken to a photographic department where it is photographed. The proof copy having served its purpose is then discarded. The negative plate or film of the proof copy is next developed and prepared for transferring to the printing plate. The printing plate is then prepared by photochemical methods from the negative plate.

The operations involved in preparing the printing plates by photochemical methods are numerous, time consuming, and involve considerable expense. In fact, since the preparation and use of photochemically prepared printing plates offers several advantages over the methods of printing which use cast or set type, it is believed that the usefulness of such plates has been reduced and their development retarded by the complexity and expense of preparing text matter for the plates.

It is an object and feature of this invention, in so far as the art of printing is concerned, to improve this situation by making available a machine which will set the type for the text to be printed directly upon the photochemical plate or on the negative film from which the photochemical plates are made. It is an object and feature of this invention to eliminate from the process of photochemical plate preparation the operations of setting the type, the making of the proof copy and the photographing of the same. It is a further object and feature of this invention to provide a means of setting type for the photochemical plate method of printing which far surpasses in speed that of any presently known method of setting type and by so doing to reduce appreciably the cost of that operation.

It is a further object and feature of this invention to make available a machine the typesetting portion of which may be installed at a point remote from the controlling portion and thereby enable copy prepared at one location to be set at a second location without intervening operations.

It is a still further object and feature of this invention to provide a machine which will automatically space words within a line or "justify" in order to maintain the margins of the printed matter even.

In the art of communication there have been developed mechanical machines which print directly on tapes or sheets the alphabetical and other characters which are sent to them in the form of electric signals. These are, for example, teletypewriting and similar machines. These, however, are limited in the speed of their operation by the inertia of moving mechanical parts so that they become unreliable above certain speeds of character transmission. Also because of the simplicity of the electric signals used in these machines, a person equipped with suitable terminal equipment may record the transmissions for his own benefit.

It is an object and feature of this invention, in so far as radio and wire communication are concerned, to make available a communications machine which will use electronic elements to a great extent in place of mechanical elements and thereby greatly increase the speed of transmission of directly printed communications.

It is a further object and feature of this invention to make available a system of radio or wire communication which may not be easily interpreted by unauthorized persons.

Other objects, features and advantages of this invention will be apparent from the following specification and accompanying drawings wherein:

Fig. 1 shows in block diagram form, the principal components of the machine which is applicable to typesetting or communications;

Fig. 2 shows a sample piece of the coded tape and drive mechanisms therefor used to control the printing function of the machine and the block diagram of electronic apparatus and electrical circuits for converting the code into electric signals and, also, in block diagram form the electronic and electrical circuits used in providing justifying or automatic spacing of words in each printed lined to keep even margins;

Figs. 2*a* and 2*b* show in block diagram form, the succeeding portions of the electronic circuits which receive the registering pulses and the signals from the coded tape and control the printing operation;

Fig. 3 shows a sample piece of the coded tape and optical systems for translating the code into electrical signals and, in block diagram form, electronic apparatus and electrical circuits for amplifying and transmitting the signals to the code converting and justifying circuits of Fig. 2;

Figs. 3*a*, 3*b* and 3*c*, respectively, show in detail the electronic elements and electrical circuits and apparatus of corresponding portions of the block diagrams of Figs. 2, 2*a* and 2*b*;

Figure 11:
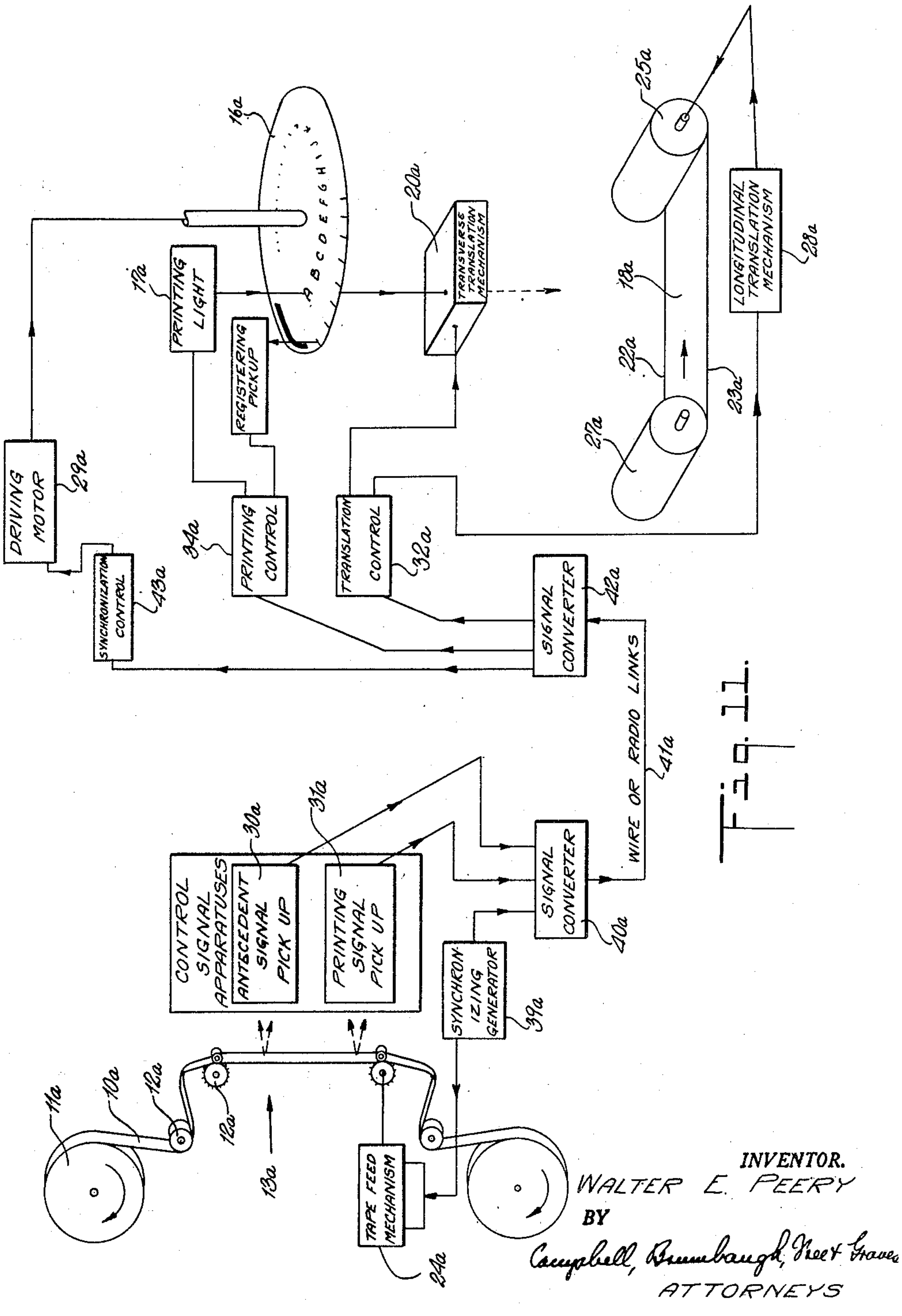
Figure 12:
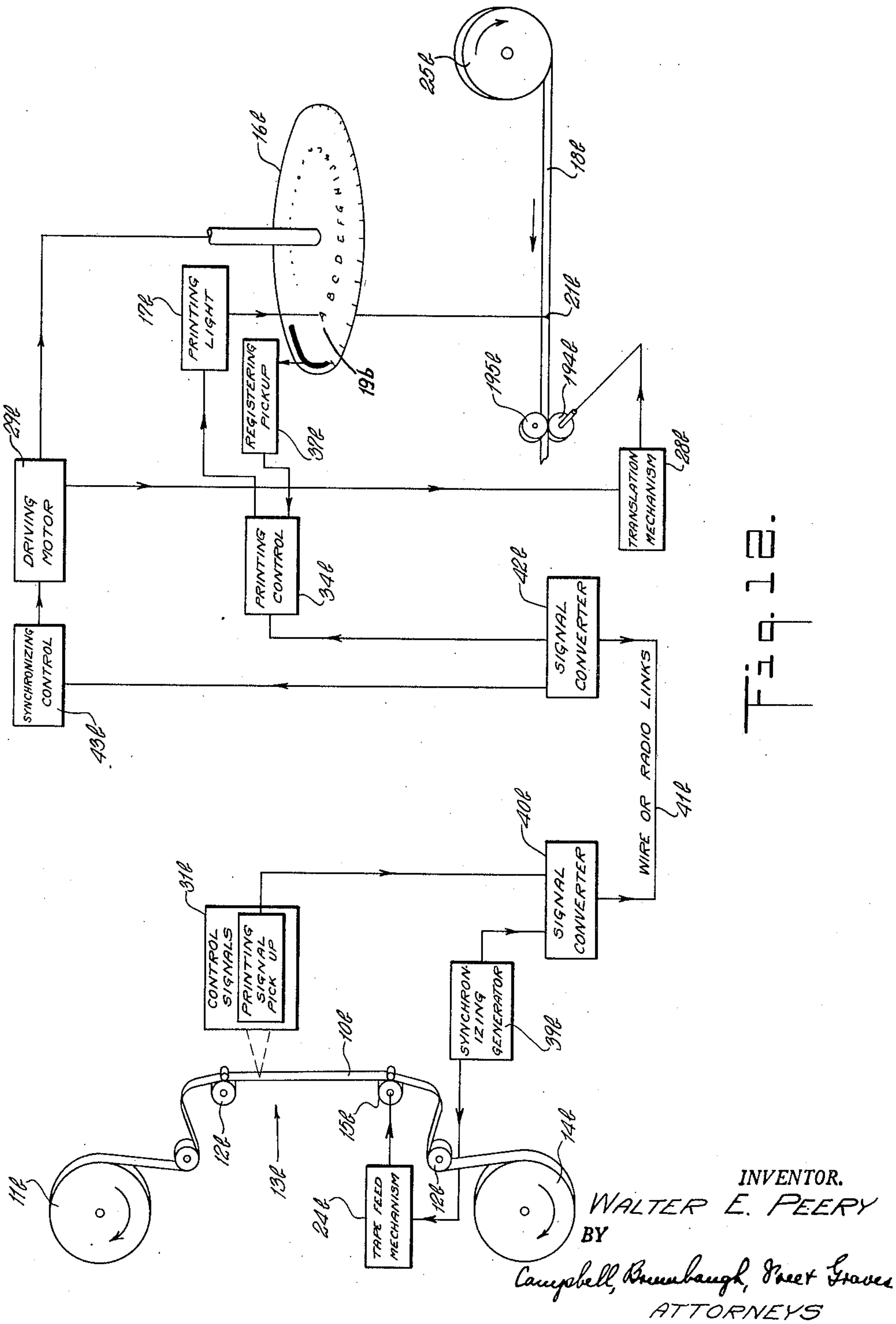

Figs. 9*a* and 9*b* show modified forms of code tapes;

Fig. 10 shows a modified form of translation mechanisms;

Fig. 11 shows in block diagram form a remotely operated photocomposing machine; and Fig. 12 shows in block diagram form a communications machine embodying the invention.

A detailed description of the operation of the machine and its modifications follows. This description is arranged in three general steps; first, a general description of its operation; second, a description based on flow diagrams, and third, a description of the electronic circuits. Also, thereafter, descriptions of modifications appear.

*General description of the photocomposing machine*

Figure 1:
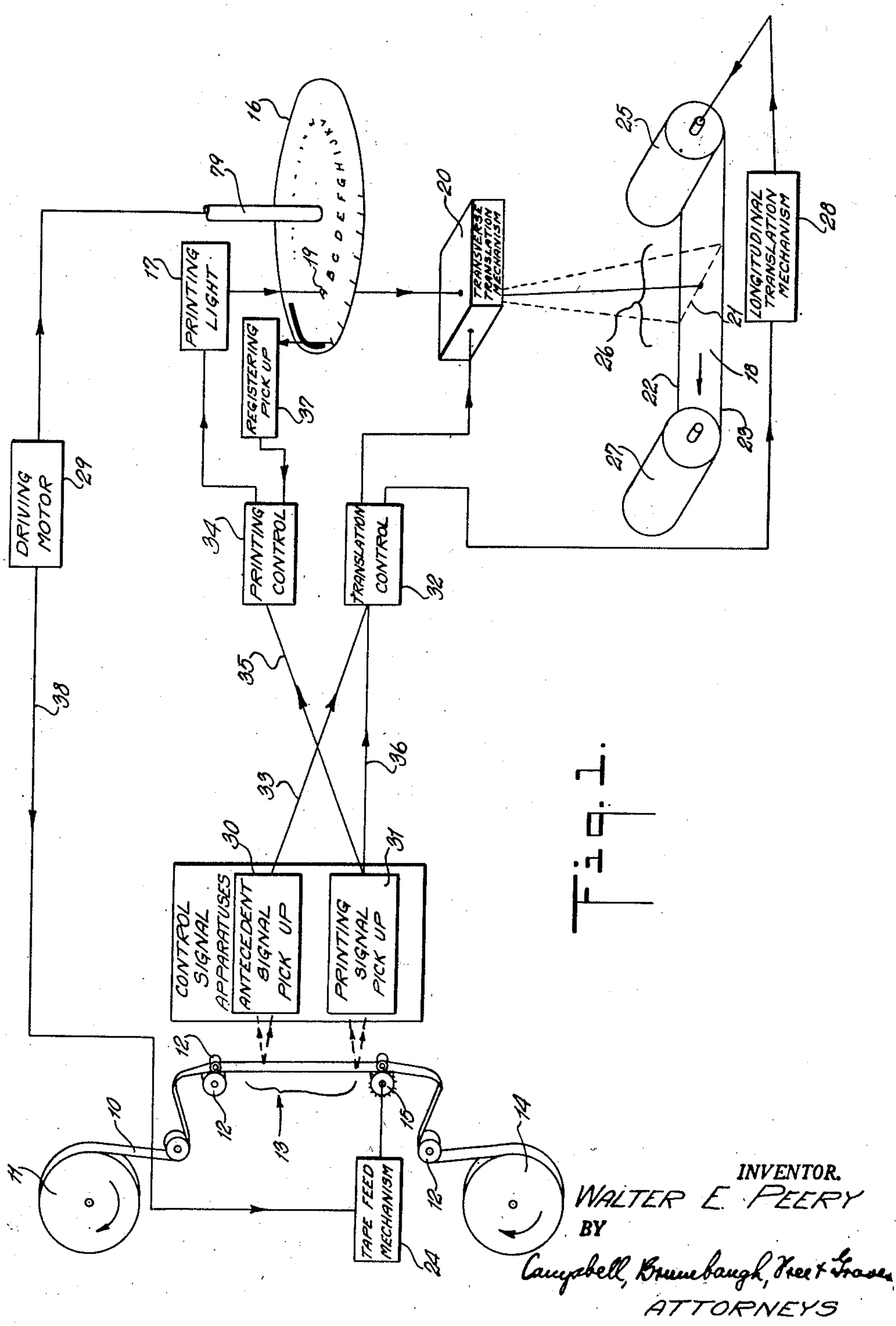

(Fig. 1)

Referring to Fig. 1, a tape 10 which contains on its surface in code form the characters to be printed and which has previously been prepared, is fed from a reel 11 through various guides 12, through the pickup region 13 to a reel 14. A sprocket or other device 15 propels the tape as required past the pickup region 13. The tape 10 may be transparent or translucent paper on which opaque code characters are imprinted or it may have other forms hereinafter to be described.

A master type disc 16 carries the font of type. The font consists of one of each character in transparent form which may be projected by means of the printing light 17 onto the sensitized material 18. The master type disc 16 rotates on its axis at a uniform speed and is so arranged that each character appears in the printing position during one revolution of the disc 16. When a character such as "A" 19 on disc 16 is in the position to be printed, the printing light 17 may be turned on to accomplish the printing photographically. The image of the character 19 will then be projected into the transverse translation mechanism 20 which will position the projection of the character in the line 21 and between two margins 22 and 23 of the sensitized material 18. The sensitized material 18 may be photographic film, paper or any other material suitable to the purpose and process.

The sensitized material 18 is fed from a reel or holder 25 across the receiving space 26 where it is exposed or printed and onto a second reel 27 by the longitudinal translation mechanism 28. This mechanism 28 provides for the intermittent propelling of the film 18 to form the individual lines of the printed matter as required or other type of propulsion as will be described.

The sensitized material 18, instead of being re-rolled onto a storage reel 27 after being exposed, may be fed directly into developing and processing operations (not shown) so that the product which emerges from the machine is ready for use.

The propulsion of the tape 10 through the pickup region space 13 is synchronized by tape feeding mechanism 24 with the rotation of the type disc 16 by being mechanically connected to a driving motor 29 or by being connected thereto through some type of synchronizing mechanism to be described.

At the pickup region or section 13, control signals are generated from the code on the tape 10 for the operation of the printing mechanism through the use of two signal pickups 30 and 31. One of these signal pickups, the antecedent pickup 30, scans the tape signals one line in advance of the printing signal pickup 31.

The antecedent signals are transmitted to the translation control circuits 32 through path 33. These circuits 32 provide for five operations on the contents of each line, preliminary to its being printed. These are: (*a*) the counting of the space taken up by each character in the line, (*b*) the counting of the word spaces in the line, (*c*) the comparing of the space taken by the characters with the total space in the line, (*d*) the dividing of the left-over space among the spaces between the words in the line, and (*e*) storing this information and delivering it to the transverse translation mechanism 20 during the subsequent printing of the line.

The tape 10 with the line of copy proceeds from the position of the antecedent signal pickup 30 to the position of the printing signal pickup 31.

There are two classes of signals picked up by the printing signal pickup 31. The first is the character code signal on the tape 10 which selects the character to be printed. This signal is delivered to the printing control 34 through path 35. The second is the character space, word space, and line signals which are delivered to the translation control 32 through path 36 and which initiate the operation of the transverse and longitudinal translation mechanisms 20 and 28 at the appropriate times.

The character code signals delivered to the printing control circuits 34 by the printing signal pickup 31 sets up within the printing control circuit 34 a sequence key which determines the character to be printed.

The key is deciphered by registering signals on the master type disc 16 which are picked up by the registering pickup 37 and delivered to the printing control 34. The key and its deciphering are in terms of the angular rotation of the master disc 16 which carries in radial rows (refer to Fig. 7) the characters 19 which may be projected by means of the printing light 17 on the sensitized material 18. That is, the character code conditions the printing control 34 so that the registering signals received by the pickup 37 cause the printing light 17 to be lighted when the character selected is in the proper position to be printed or photographed.

It is important to note that the master type disc 16 rotates at a uniform speed and that the projection and printing of a character 19 upon the sensitized material 18 occurs while the disc 16 is in motion. The relation of the angular speed of the disc 16 and the rapidity of the turning on and off of the printing light 17 is such as to prevent blurring of the projected character on the sensitized material.

It is important to note also that a sector of the master type disc 16 (see Fig. 7) is devoid of characters. During the time this blank sector is passing the printing position, the printing control 34 receives the character code signals from the printing signal pickup 31 and the control key is set. During the remainder of the revolution of the master type disc 16, the key is deciphered by the registering signals received by the registering pickup 37 and one character is printed on material 18.

To generate the control signals, the tape 10 must proceed in intermittent motion one character at a time. Progress of the tape 10 occurs only during the interval that the blank sector of the master type disc 16 is under the printing light 17, and is controlled by connection of the tape feed mechanism 24 to the driving motor 29 through a path 38. During the rotation of the master type disc 16 beyond this blank sector, the code tape 10 is stationary and no signals are received from it.

The character space signals delivered from the printing signal pickup 31 to the translation control 32 through path 36 are in turn fed into the transverse translation mechanism 20 and result in the positioning of the character in the line and allowance of the correct space for each character. When word space signals are received by the circuits of the translation control 32, the word spacing previously determined through the action of the antecedent signals is interposed between the words.

When line signals are received by the translation control 32, the longitudinal translation mechanism 28 in the present form of the invention causes the sensitized material 18 to advance the space required for one line.

A detailed description of the operation of the typecomposing machine follows. For ease of understanding the various drawings, Figs. 2, 2*a*, 2*b* and 3*a*, 3*b* and 3*c* should be considered as arranged side by side in that order.

*The code tape and generation of control signals*

Figure 3:
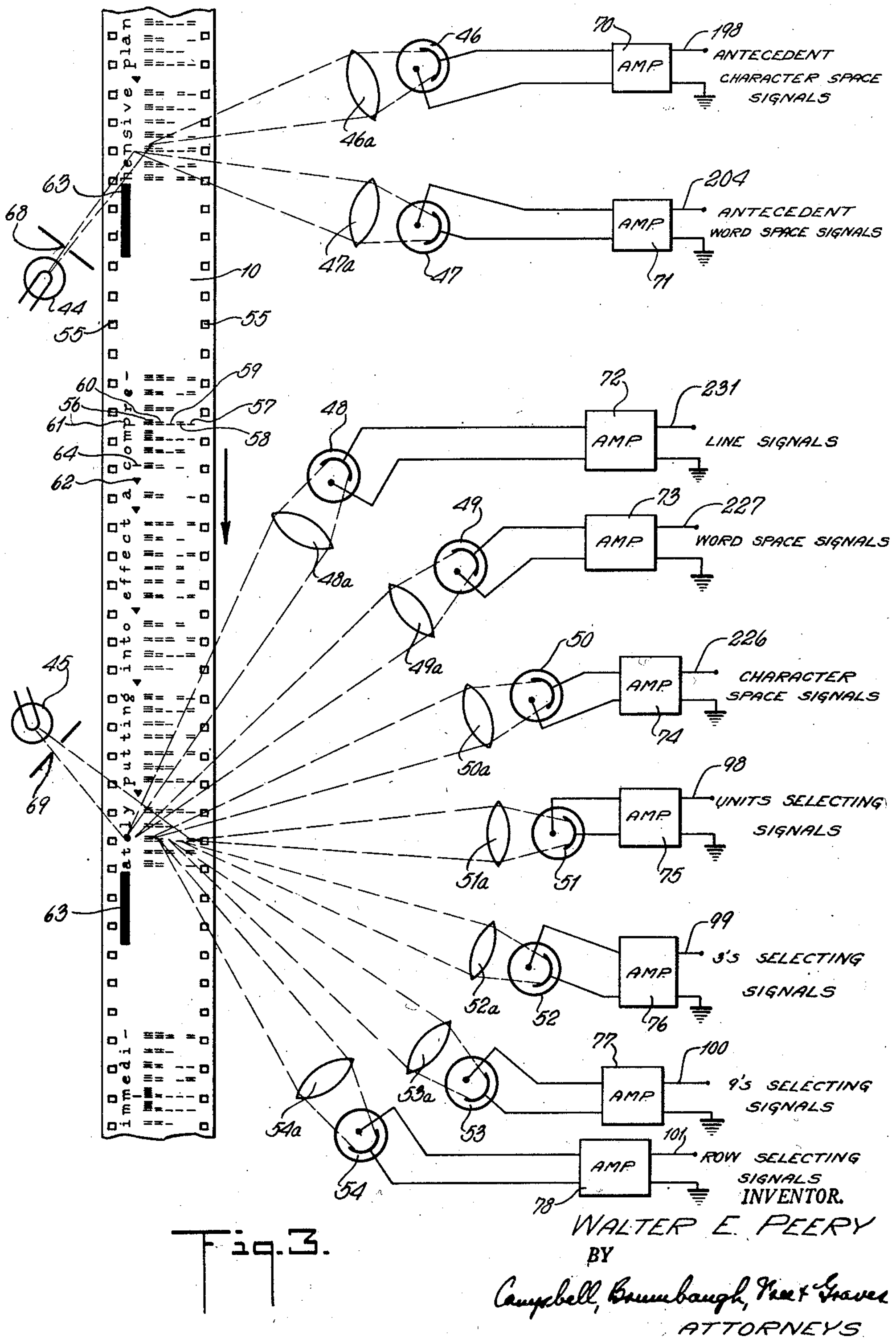

(Figs. 1 and 3)

In Fig. 3 is shown a segment of the code tape 10 in the pickup zone or region 13 of Fig. 1. This Fig. 3 illustrates the code on the tape and one arrangement for generating the control signals from the code on the tape.

The tape 10 may be of any material suitable for the purpose which is capable of having the code signals imprinted on or deposited or otherwise placed within its borders. In the embodiment of the invention shown, the tape 10 is of paper upon which the code signals are imprinted as darkened areas. The tape at the pickup region is illuminated at two areas, respectively, by suitable lamps 44 and 45. The lights reflected from the tape 10 into the appropriately positioned sets of photoelectric cells 46, 47 and 48–54, inclusive, through the respective lenses 46a–54a, inclusive, varies as the cells scan dark and light areas of code marks and paper, and result in the generation of the control signals by the respective cells in the form of current or voltage pulses.

In the alternative, as shown in Fig. 9a, the tape 10c may be transparent or translucent and interposed between exciting lamps 45c and photoelectric cells 52c, 53c, 54c, etc., and the code signals upon it may be opaque areas.

In another alternative shown in Fig. 9b, the tape 10d may be opaque and also interposed between exciting lamps 45d and photoelectric cells 52d, 53d, 54d, etc., and the code signals may be transparent, translucent, or punched out areas in the tape.

The tape 10 shown is equipped with sprocket holes 55 which are engaged by the sprockets of the tape feed sprocket 15. The tape 10 is prepared on a machine similar in appearance and operation to a typewriter. As each key of this typing machine is depressed, the proper code marks 56, 57, 58, 59 and 60 are printed on the tape as well as the character 61 itself. When the space bar is pressed, a space code mark 62 is printed on the tape. This machine will prepare, in addition to the tape 10, a copy of the composed material having the approximate width of the column and the same relative character sizes as the type to be set. This copy is for the guidance of the typist preparing the tape. When the carriage upon which this copy is being typed is returned to begin a new line, a line code mark 63 will be printed on the tape. When a tabular key is pressed on the typing machine, spacing marks 56 without accompanying code marks 57, 58, 59 or 60 are printed on the tape. The automatic spacing or "justifying" code mark 64 will be placed on the tape 10 whenever the characters plus spaces of any line exceed a certain proportion of the line space. The spacing between the line code marks 63 on the tape will always be a fixed distance apart to facilitate the transfer of the scanning functions of the two sets of photoelectric cells 46, 47 and 48–54, inclusive, from one line to the next simultaneously.

Referring to Fig. 3, on the length of tape 10 illustrated are printed the characters 61 and the code markings 56 to 60, inclusive, 62, 63 and 64, from which the control signals are generated comprising the copy to be printed. The characters 61 appearing on the tape are for convenience in proof reading and checking the copy during the preparation of the code tape. Signals denoting the termination of a line are rectangular darkened areas 63. Code markings denoting spaces between words are triangular darkened areas 62 opposite each word space. Tape code markings which initiate the automatic spacing of words are rectangular areas 64. Tape code markings which select the particular row 65, 66 or 67 (Fig. 7) of characters 19 on the type disc 16 are groups of short lines 60 alined with each character 61. Tape code markings which select the amount of space each character is allotted are groups of short lines 56 alined with each character 61. Tape code markings which set up the key for the printing control are in three groups of short lines 57, 58 and 59 alined with each character 61. The characters 61 and their associated groups of code marks occupy unit spacing on the tape.

As the tape 10 so prepared travels through the scanning area 13 of Fig. 1, it passes the two sets of photoelectric cells 46, 47 and 48–54, inclusive, which scan and interpret the different tape code marks described. One set of cells 46, 47 comprises the antecedent signal pickup 30 of Fig. 1 and consists of the photoelectric cells 46 and 47. The second set comprises the printing signal pickup 31 of Fig. 1, and consists of photoelectric cells 48 to 54, inclusive. These two sets of photoelectric cells are illuminated, respectively, through their lens systems 46a–54a by the necessary light sources 44 and 45 which direct light through the respective apertures 68 and 69 to illuminate properly the various code markings on the tape 10 in area 13.

The outputs of the photoelectric cells 46–54, inclusive, are connected, respectively, to the amplifiers 70–78, inclusive, which are of conventional type with a minimum of distortion.

The photoelectric cell 47 of the antecedent signal pickup 30 scans the line or column on the tape 14 which contains the word or space code marking 62 and the automatic word spacing initiating code mark 64. When a word space mark 62 passes through the scanned field, the triangular darkened area will cause a pulse to be generated in the output circuit of the photoelectric cell 47. In the travel direction of the tape 10, since the darkened area of the mark 62 increases from zero to a maximum value due to its triangular shape as it proceeds through the scanned area, the light reflected from the source 44 into the cell 47 will diminish correspondingly and at the time rate corresponding to the rate of travel of the mark 62 through the scanned field. The signal generated by the cell 47 in its output circuit will have a corresponding time rate of amplitude change.

As the word space code mark 62 passes the scanned field of the cell 47, the transition from dark area to light is abrupt which will cause a corresponding time rate of amplitude change in the signal generated by the cell 47. The total signal pulse thus generated by the cell 47 is known as a saw-tooth signal because of its resemblance to a saw tooth in a plot of time versus amplitude. The output of the cell 47 is connected to the amplifier 71 so that this signal is amplified for use as an antecedent word space signal.

When the automatic spacing initiating code mark 64 passes through the scanned field of the cell 47, the pulse signal from the photoelectric cell 47 will be of relatively short time duration and will have a roughly rectangular shape of amplitude vs. time. This is due to the fact that the darkened area of the mark 64 which the photoelectric cell scans, has an abrupt beginning and ending. The different time rates of change of the amplitudes and time durations of these two signals caused by the code marks 62 and 64 and generated by cell 47 allows the translation control circuit 32 of Fig. 1 (to be described) to differentiate between them and perform the selected function.

It will be noticed that a word space code mark 62 occurs opposite each word space and that only one automatic spacing initiating code mark 64 is contained in each line of composed matter on the tape 10. The automatic spacing initiating code mark 64 is placed on the tape 10 only when a full line of type is to be printed. If the line of composition does not occupy more than a predetermined amount of space, automatic word spacing will not be initiated, a standard space will be inserted between each word and the termination of the printed line will occur to the left of the colum margin. This feature takes care of paragraphs ending in mid-line and prevents abnormal amounts of word spacing in these cases.

The photoelectric cell 46 scans the column or line of character space code marks 56 of tape 10. This scanning is arranged so that as each code mark 56 in the character space code group of tape 10 passes through the scanned field of the cell 46 a normally rectangular pulse is generated in its output circuit which is connected to amplifier 70. The number of lines in each character space code group 56, and therefore, the number of pulse signals in the output of the photoelectric cell 46 for each code group scanned is proportional to the space to be occupied by that character.

The signals generated by cells 46 and 47, amplified by their amplifiers 70 and 71 when acted upon by the translation control 32 of Fig. 1, as will be described, provide for the preliminary counting of the total space occupied in a line to be printed on the film 18 by the characters in that line, the preliminary counting of the number of word spaces in each line, and the initiating of the automatic spacing of words.

Referring now to the second group of photoelectric pickup cells 48–54, inclusive, in Fig. 3, the cell 48 generates in its output circuit a rectangular pulse of relatively long time duration whenever a line code mark 63 passes through its scanning field. This pulse is amplified by the amplifier 72. The cells 49 and 50 generate in their output circuits the same kinds of signals that were previously generated by cells 46 and 47 due to the respective code marks 62, 64 and 56. These signals are amplified, respectively, by the amplifiers 73 and 74. The cells 51, 52, 53 and 54 generate in their output circuits pulse signals that are comparatively short in time duration and which correspond in number to the marks in the lines or columns of code groups 57, 58, 59 and 60 on the tape 10. The latter signals are amplified by the amplifiers 75, 76, 77 and 78, respectively.

The outputs of each of the cells 46 to 54, inclusive, are connected, respectively, to the inputs of the suitable electronic amplifiers 70 to 78, inclusive, of conventional substantially distortionless types to bring the energy of the respective signals without distortion up to that required by the circuits they operate and presently to be described.

*The master type disc and generation of registering signals*

Figure 7:
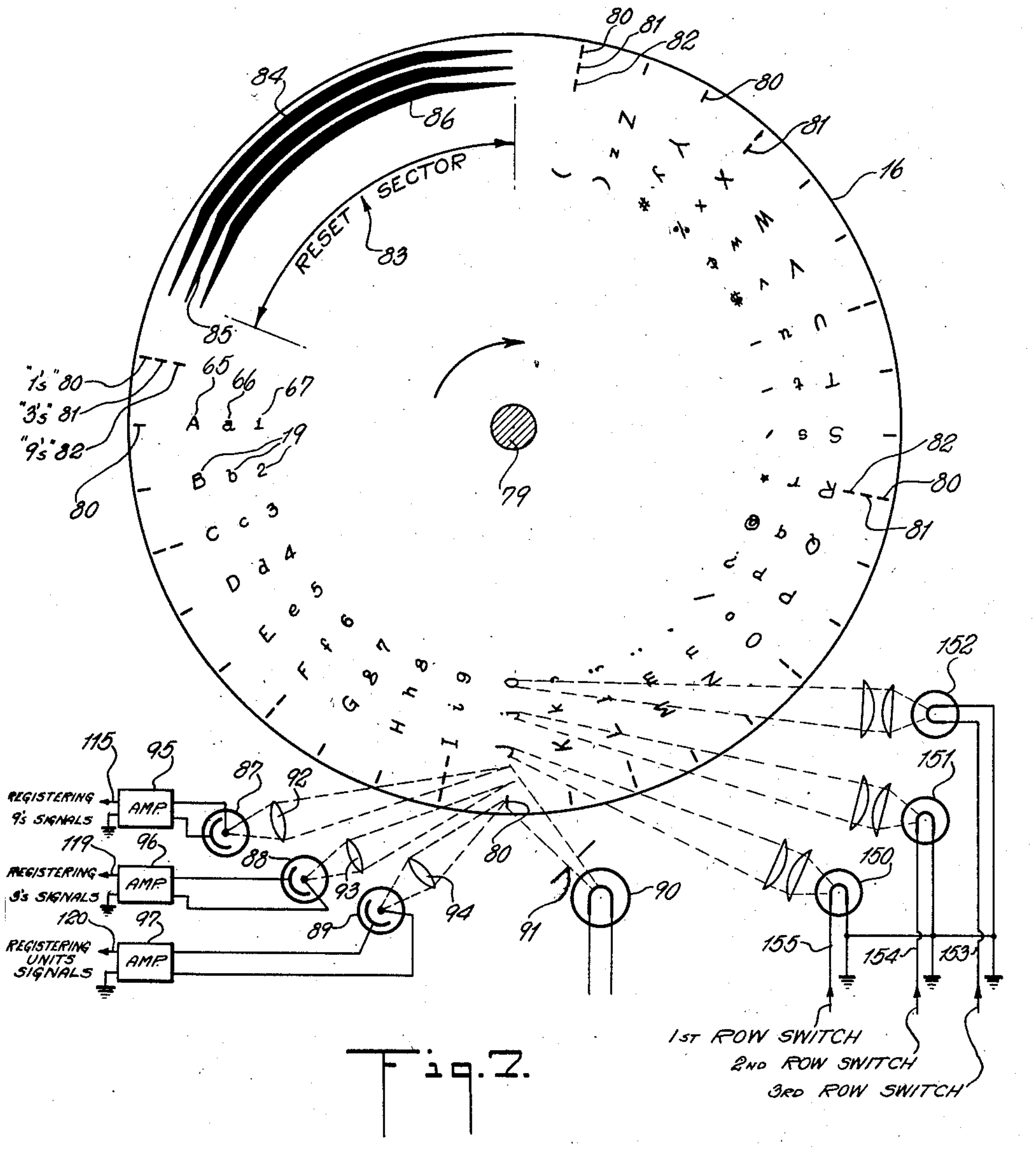
Fig. 7 shows the master character disc which is a part of the printing mechanism and upon which are carried the type font and other characters which are to be printed and also register marks which are used in the generation of registering pulses.

(Figs. 1 and 7)

Illustrated in Fig. 7 is a plan view of one form of the master type disc 16 of Fig. 1 and the arrangement for generating registering signals therefrom. The disc 16 is circular in form and is rotated upon its axis 79.

Upon radials of the disc 16 which we will refer to as the "character radials" are placed the rows 65, 66 and 67 of characters 19 of the type font which are to be projected upon the photosensitive material 18. Also upon the radials of disc 16 are placed register marks 80, 81 and 82 which are used for the generation of registering signals. The rows 65, 66 and 67 of characters 19 are arranged in concentric circles, each of which circles we shall refer to as a "character row" and number from the outside to inside for convenience in explaining the invention. There may be as many rows of characters as the physical operation of the machine will permit.

The register marks 80, 81 and 82 are arranged also in concentric circles or rows and in the present form of the invention there are three rows of such marks. One row of marks 80 (the outer row) contains a mark 80 for each character radial with a fixed angular relationship to its associated character radial. These marks 80 will be referred to as the "units" or "1's" registering marks. (The marks 80 are shown "on" the radial in Fig. 7 but may be displaced to any degree either clockwise or counterclockwise with respect to the character radials.) Another row of marks 81 (the center row in this form of the invention) contains a mark with a certain angular relationship to each third character radial and approximately in line radially with the third of each 1's registering mark 80. These marks 81 will be referred to as the "3's" registering marks 81. Another row of marks 82 (the inner row in this form of the invention) contains a mark with a certain angular relationship to each ninth character radial and approximately in line radially with the ninth of each 1's registering mark 80. These marks 82 will be referred to as the "9's" registering marks. The rows of characters are thus divided into 9's principal sectors of nine 1's character radials 80 each. Each principal 9's sector is subdivided into three sub-sectors of 3's character radials 81 each.

A portion 83 of the master type disc 16 referred to as the "reset sector" is devoid of characters. In each row of the registering marks 80, 81, 82 within the reset sector 83 is, respectively, an elongated mark 84, 85 and 86 with tapered ends from which are generated reset signals for the printing control circuits 34 of Fig. 1.

The disc 16 rotates about its axis 79 at a uniform speed and is driven by the suitable motor 29 (Fig. 1). The disc 16 itself is of a transparent material. All space upon it, however, except that in the characters 19 in rows 65, 66, 67, the synchronizing signal marks 80, 81, 82 and the reset marks 84, 85, 86, is opaque. The disc 16 is of a thickness suitable for the purpose intended.

Registering and reset signals are generated by the photoelectric cells 87, 88 and 89 by the following arrangement. Light from an exciting lamp 90 is directed through an aperture 91 onto the disc 16 in the area of the marks 80, 81, 82 and 84, 85, 86 and by suitable lenses 92, 93, 94 into the respective photocells 87, 88 and 89. The registering code marks 80, 81 and 82 of the master type disc are positioned relatively to the disc 16 and the light beams from the source 90 so that no light is received by the cells 89, 88 or 87 until a transparent registering mark 80, 81, 82 opens a particular light path to the appropriate cell or cells 89, 88, 87. When a registering mark 80, 81, 82 passes through the scanned field, a flash of light of short time duration is transmitted and causes that or those cells 89, 88, 87 to generate short time duration pulse signals. The cell 89 will generate a registering pulse signal for each 1's registering mark 80 that passes through the scanned field. The cell 88 will generate a registering pulse signal for each 3's registering mark 81 that passes through its scanned field. The cell 87 will generate a registering pulse signal for each 9's registering mark 82 that passes through its scanned field.

When the reset marks 84, 85 and 86 pass through the scanned fields of the three cells 89, 88 and 87, a reset signal pulse of long time duration will be generated by each cell. Each such reset signal pulse will have a gradual build-up amplitude at its beginning and a gradual decay at its ending as compared to the registering signal pulses. This difference between the build-up time of the two kinds of pulses will enable the printing control circuits (34 of Fig. 1) to differentiate between them and respond to provide the function desired as will be described.

The outputs of the cells 87, 88 and 89 are fed, respectively, into the amplifiers 95, 96 and 97 of conventional substantially distortionless types which raise the energy of the respective pulses to that required for the proper operation of the printing control circuits 34 (Fig. 1) as will be described.

*Flow diagrams of printing control circuits*

(Figs. 1, 2, 2*a*, 2*b* and 8)

Figure 2:
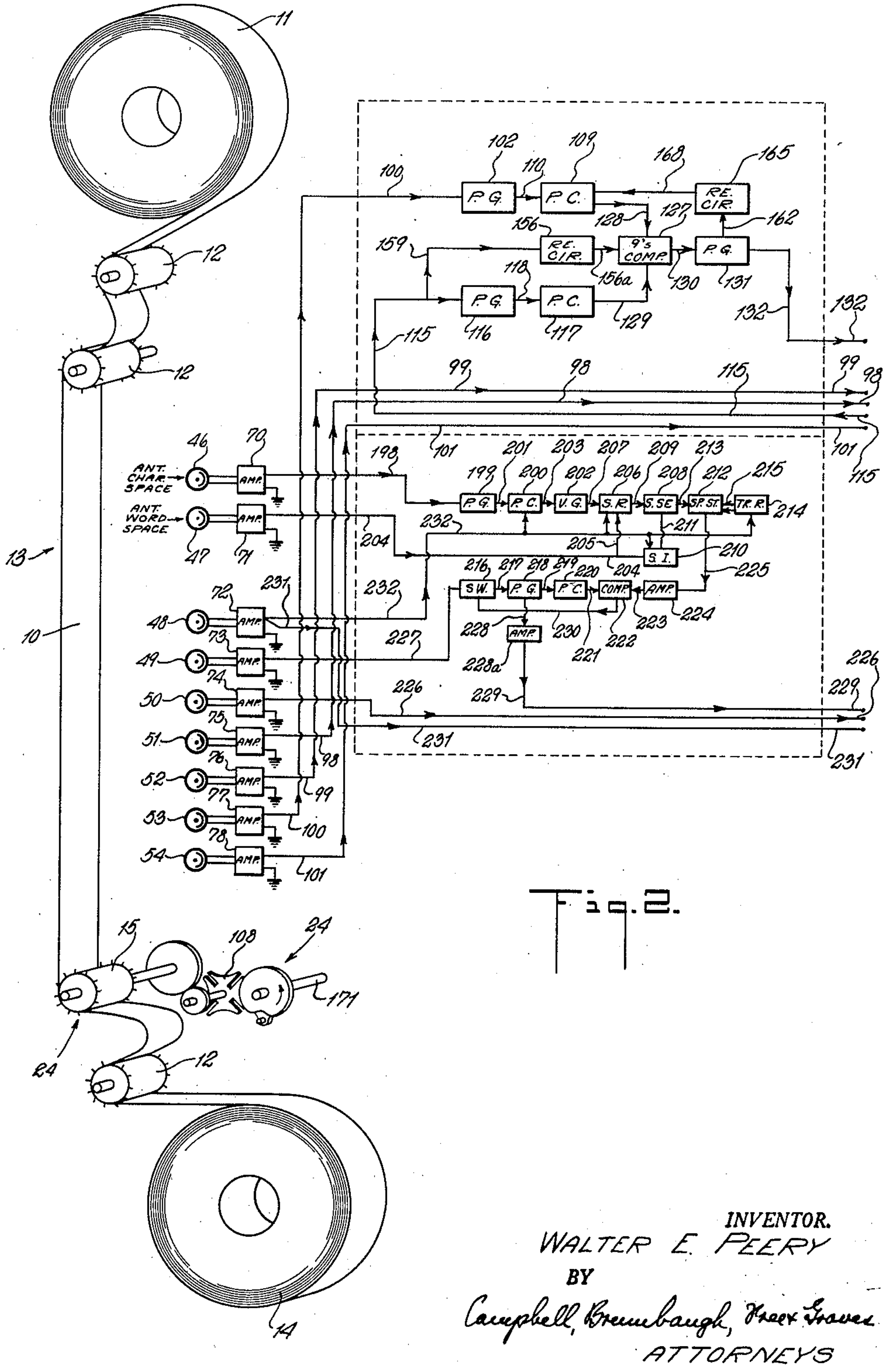
Figure 2A:
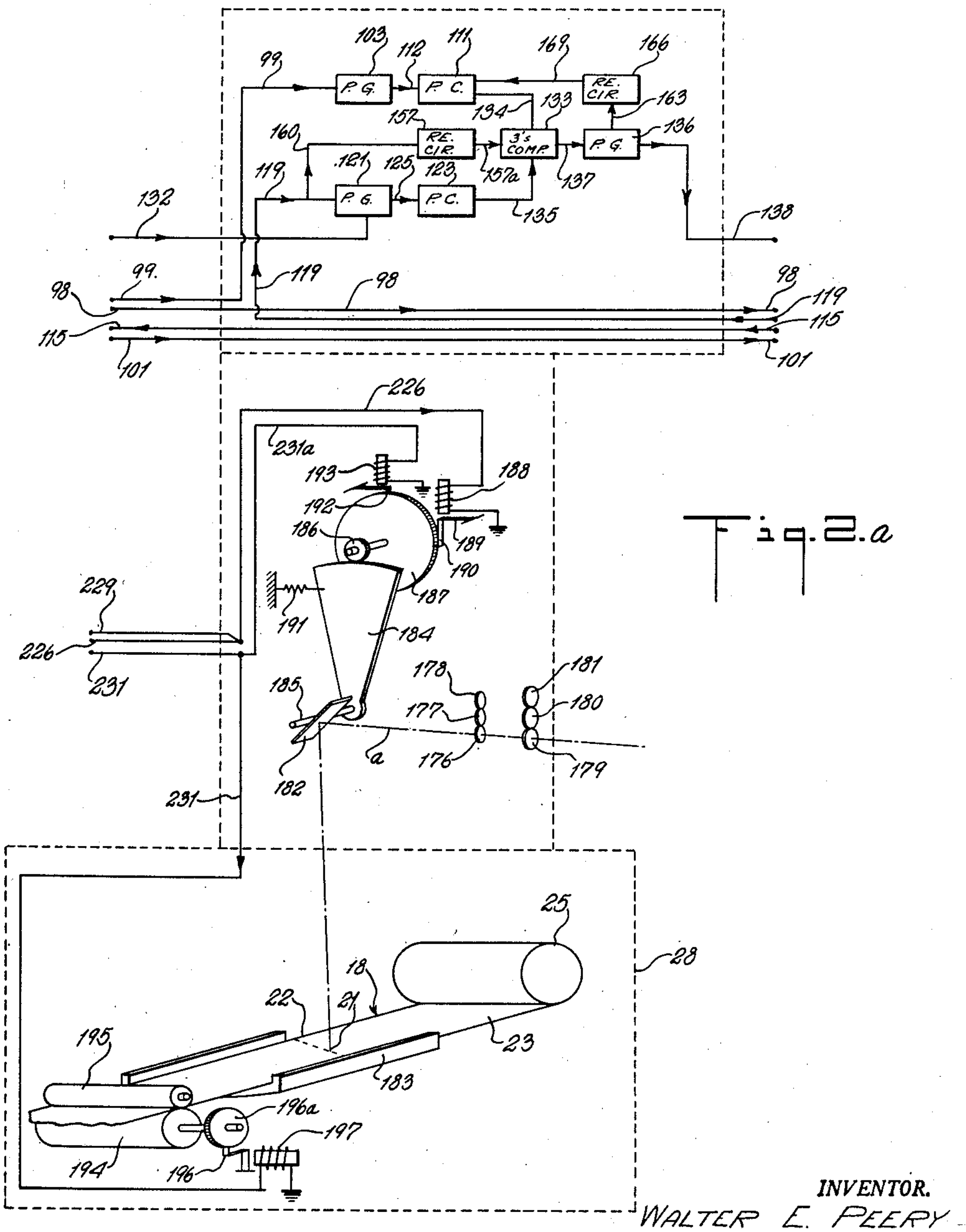
Figure 2B:
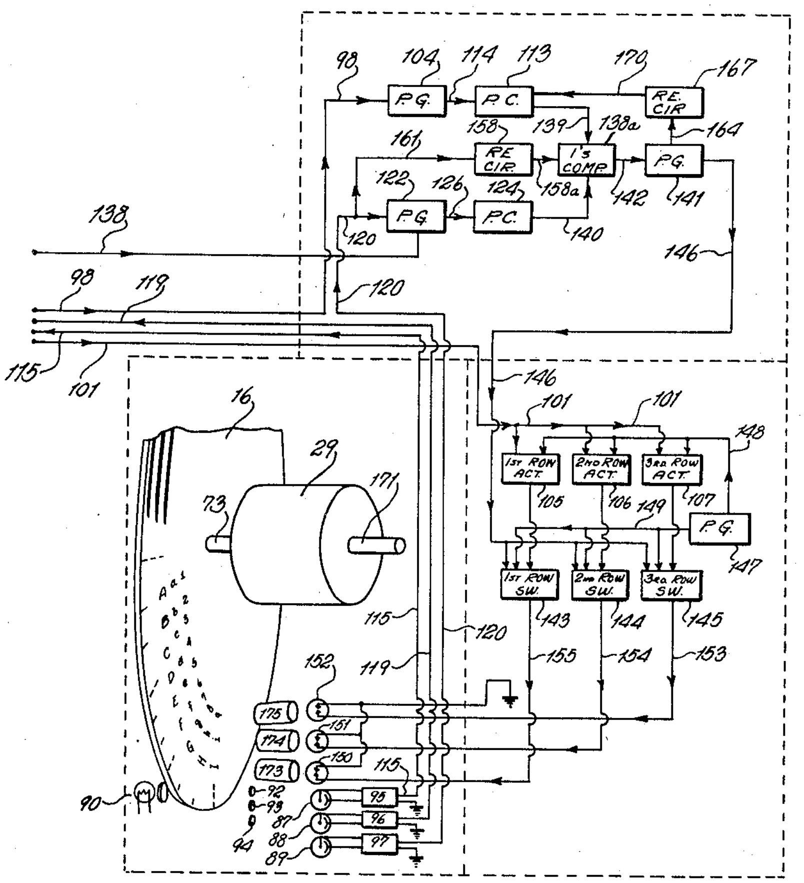
Figure 8:
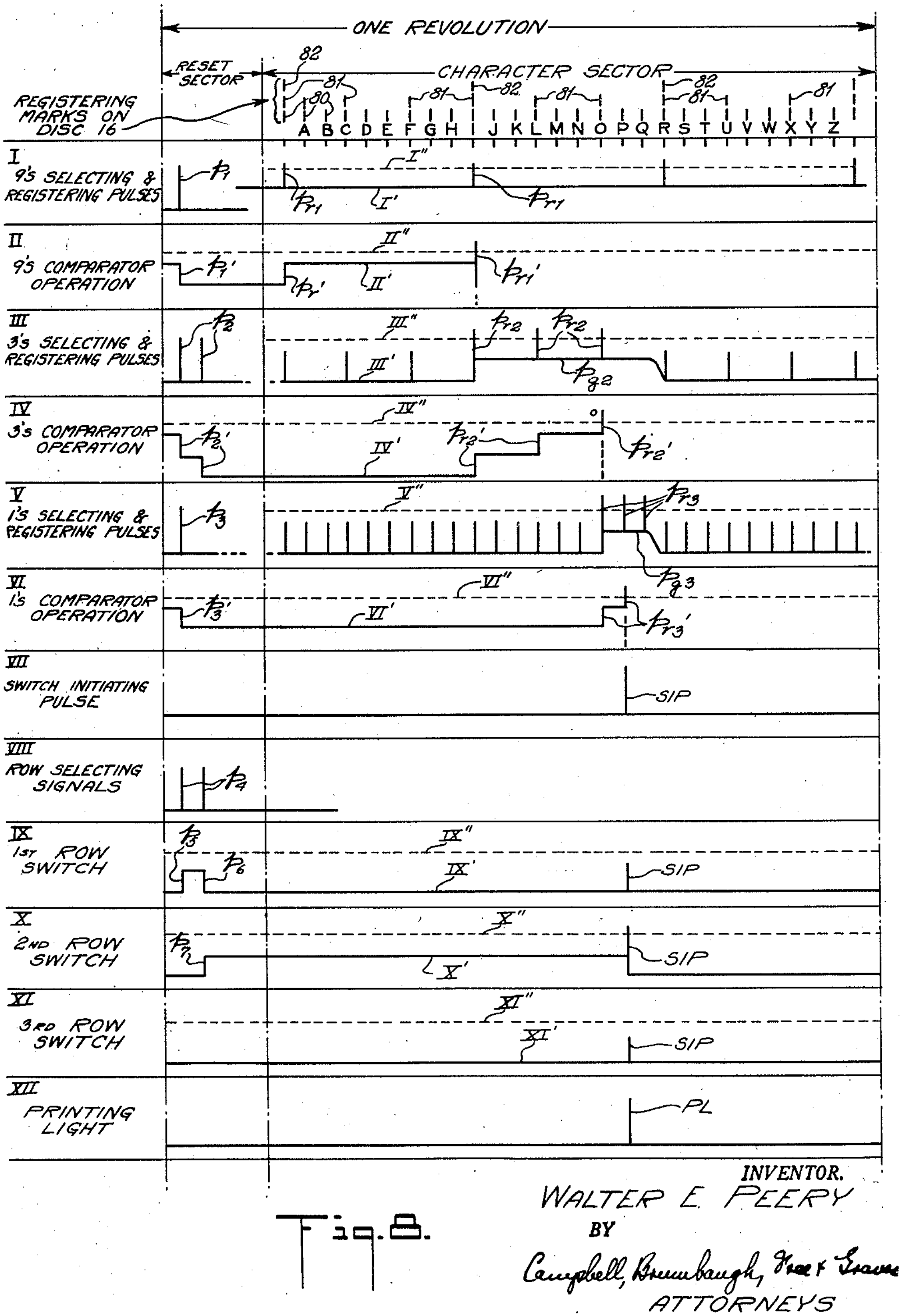
Fig. 8 shows graphically the time and sequence relationships in the printing control circuits.

Figs. 2, 2*a* and 2*b* show, in flow diagram form, the operation of the circuits of the printing control 34 of Fig. 1. Fig. 8 is a time sequence chart of the operations of these circuits during one revolution of the character disc 16. Referring to the flow diagram in Figs. 2, 2*a* and 2*b*, the tape initiated control pulses from the amplifiers 75, 76, 77, 78 which are produced by the photoelectric cells 51, 52, 53 and 54, respectively, shown in Fig. 3, are connected, respectively, by the conduits 98, 99 and 100 to the pulse generators 104 (Fig. 2*b*), 103 (Fig. 2*a*) and 102 (Fig. 2), respectively, and by the conduit 101 to the row activators 105, 106 and 107 (Fig. 2*b*), respectively, as shown. Thus, the amplifier 75 is connected by conduit 98 to the pulse generator 104, the amplifier 76 by the conduit 99 to the pulse generator 103, the amplifier 77 by the conduit 100 to the pulse generator 102, and the amplifier 78 by the conduit 101 to the three row activators 105, 106 and 107.

On the tape in Fig. 3, the code groups 57, 58 and 59 cause pulses to be generated by the cells 51, 52 and 53 which correspond, respectively, to the 1's, 3's and 9's pulses generated by the type disc 16 of Fig. 7. The tape 10 itself moves intermittently one character at a time and is driven by the Geneva movement 108 and the sprocket 15a or similar mechanism. This movement 108 is timed so that the code characters on the tape 10 are scanned by their respective photo-electric cells during the period that the master type disc 16 is rotating through the reset sector 83. That is, the tape 10 is in motion during the time the reset sector 83 of disc 16 is rotating past the position of the projecting lamp 90. During this period the character code is set up in the circuits of the printing control 34 of Fig. 1 by the control signals from the tape 10. During the remainder of the rotation of the character disc 16, the tape 10 is stationary.

The 9's selecting pulses created by the code characters 59 on the tape 10 and generated by the cell 53 are connected from its amplifier 77 via the conduit 100 to the pulse generator 102 of Fig. 2. The function of this pulse generator 102 is to generate a pulse of uniform amplitude and shape which will be suitable for use in the circuits following. For each of the 9's selecting pulses received by the pulse generator 102, one pulse will be generated by it. The pulse counter 109 connected to the pulse generator 102 by conduit 110 counts the number of pulses generated by the pulse generator 102.

The 3's selecting pulses created by the code characters 58 on the tape 10 and generated by cell 52 in Fig. 3 are connected from its amplifier 76 via the conduit 99 to the pulse generator 103 of Fig. 2*a* which has a similar function to the pulse generator 102. The pulse counter 111 connected to the pulse generator 103 by the conduit 112 similarly counts the pulses generated by the pulse generator 103.

The 1's selecting pulses created by the code characters 57 on the tape 10 and generated by the cell 51 of Fig. 3 are connected from its amplifier 75 via the conduit 98 to the pulse generator 104 of Fig. 2*b* which has a similar function to the pulse generator 102. The pulse counter 113 connected to the pulse generator 104 by the conduit 114 counts the number of pulses generated by the pulse generator 104.

The row selecting pulses created by the code characters 60 on the tape 10 and generated by the cell 54 of Fig. 3 are connected from its amplifier 78 via the conduit 101 to the row activators 105, 106 and 107 of Fig. 2*b*. This circuit is so arranged that if one pulse is delivered to the row activators from the amplifier 78, the first row activator 105 will be energized. If two pulses are delivered, the second row activator 106 will be energized. If three pulses are delivered the third row activator 107 will be energized. There may be any number of row activators and the number will be equal to the number of character rows on the master type disc 16.

The 9's registering pulses coming from the master type disc 16 and created by the 9's code characters 82 and generated by the cell 87 (Figs. 7 and 2*b*) are transmitted from the amplifier 95 by the conduit 115 to the pulse generator 116 (Fig. 2) to generate a pulse in the same manner as the pulse generator 104. Thus, for each pulse generated by the cell 87, the pulse generator 116 will also generate a pulse. The pulse counter 117 connected by the conduit 118 to the pulse generator 116 counts each of these pulses. Similarly, the 3's and 1's registering pulses generated, respectively, in the cells 88 and 89 by the code characters 81 and 80 are transmitted from the respective amplifiers 96 and 97 via the respective conduits 119 and 120 to the respective pulse generators 121 (Fig. 2*a*) and 122 (Fig. 2*b*). The pulse counters 123 and 124 connected by the conduits 125 and 126, respectively, to the respective pulse generators 121 and 122 count the pulses from the latter when they are activated by their respective gate pulses initiated by the pulse generators 131 and 136, respectively, through the conduits 132 and 138, respectively, as will be described in greater detail below.

The 9's comparator 127 (Fig. 2) connected by the conduits 128 and 129 to both pulse counters 109 and 117, respectively, is so arranged that when the pulse counter 117 has counted one more pulse than the pulse counter 109 has counted, an initiating voltage is delivered from the 9's comparator 127 via a conduit 130 to the pulse generator 131. For instance, if there has been one 9's selecting pulse received by the pulse generator 102 from the control pulse source created by the code character 59 on tape 10, then on the second 9's registering pulse received by the pulse generator 116 from the code character 82 on the disc 16, the 9's comparator 127 will deliver the initiating pulse to the pulse generator 131.

The gate pulse from pulse generator 131 is connected by the conduit 132 to the pulse generator 121 (Fig. 2*a*) and performs a function known as gating. The pulse generator 121 cannot function except during the duration of the gate pulse from the generator 131. This gate pulse has a time duration equal to the time taken by one of the principal registering sectors (9 unit sectors 80) of the master type disc 16 to pass the registering signal pickup point. Therefore, the pulse generator 121 is activated during the passage of one and only one principal registering sector (9 unit sectors) past the signal pickup point for the cell 87.

When the pulse generator 121 (Fig. 2*a*) has received the 9's gate pulse, it begins generating pulses after that instant from the 3's registering pulses generated by the action of the code characters 81 on the cell 88 and delivered via the conduit 119. When the pulse counter 123 has counted one more pulse than was counted by the pulse counter 111, the 3's comparator 133, connected by the conduits 134 and 135 to the pulse counters 111 and 123, initiates a pulse from the pulse generator 136 which is connected by a conduit 137 to said comparator 133. The gate pulse from the pulse generator 136 is connected by the conduit 138 to, and activates pulse generator 122 (Fig. 2*b*) in the same way that the pulse generator 121 was activated.

The gate pulse from the pulse generator 136 has a time duration equal to the time taken by one of the sub-registering sectors (3 1's sectors 80) of the master type disc 16 to pass the registering signal pickup point for the cell 89. Therefore, the pulse generator 122 (Fig. 2*b*) is activated during the passage of one and only one subsector within the previously selected principal sector.

When the pulse generator 122 (Fig. 2*b*) has received the three unit gate pulse via the conduit 138, it begins generating pulses after that instant from the 1's registering signals, generated by the code marks 80 of the disc 16. When the pulse counter 124 has counted one more pulse than the pulse counter 113, the 1's comparator **138*a*, connected by the conduits 139 and 140 to the pulse counters 113 and 124, initiates a pulse from the pulse generator 141 which is connected by the conduit 142 to the comparator 138*a*. The pulse from the pulse generator 141 will be referred to as the "switch initiating pulse" SIP and this pulse SIP occurs simultaneously with the proper positioning of the character 19 in the row 65, 66 or 67 on the master type disc 16 which it is desired to print; that is, the proper positioning of the radial upon which that character 19** is situated.

In other words, the 9's gate pulse must be received before the 3's gate pulse can act and the 3's gate pulse must be received before the switch initiating pulse can be generated.

As an example, suppose it is desired to print the lower case letter "p" from the tape 10. The sequence of events can be followed on the charts of Fig. 8. As can be seen from the type disc 16 of Fig. 7, and the notation at the top of Fig. 8, this letter occurs on the type disc 16 in the second principal sector, the third subsector of the second principal sector and is the second character within the said third subsector. It is also in the second character row 66. The code character signals on the tape 10 of Fig. 3 for the letter p consist, as shown, of one signal in the 9's selecting signals group 59, two signals in the 3's selecting signals group 58, and one signal in the units selecting signal group 57. (Pulse signals $p1$, $p2$, and $p3$ of Fig. 8.) The pulse signals $p1$, $p2$, $p3$, generated by the code characters 59, 58 and 57 for the letter p on the tape 10 in the cells 53, 52 and 51 will be received by and counted by the selecting signals pulse counters 109, 111 and 113 as follows:

Pulse counter 109 will count 1 pulse ($p1'$ of Fig. 8).
Pulse counter 111 will count 2 pulses ($p2'$ of Fig. 8).
Pulse counter 113 will count 1 pulse ($p3'$ of Fig. 8).

In Fig. 8, in horizontal rows II, IV and VI, counting of the selecting pulses $p1'$, $p2'$, $p3'$ by the 9's, 3's or 1's comparators 127, 134 and 138 is shown by a stepdown. Counting of registering pulses $pr1'$, $pr2'$, $pr3'$, is shown by a step-up in the horizontal rows II, IV and VI. When the algebraic sums of the pulses $p1'$ and $pr1'$, $p2'$ and $pr2'$, $p3'$ and $pr3'$ counted cause the solid lines II', IV' and VI' to cross the respective dashed lines II', IV'' and VI'', etc. in the corresponding rows II, IV, VI, etc., the specific comparator 127, 133 or 138*a* will deliver its initiating pulse to its associated pulse generator 131, 136 or 141, respectively.

The selecting signals $p1$, $p2$ and $p3$ are received and their pulses are counted during the period the reset signals from the marks 84, 85, 86 (Fig. 7) are being generated by the registering signal pickup cells 89, 88 and 87 and the pulse counters 117, 123 and 124 are being reset from the previous counting operation as will be described.

As soon as the registering marks 80, 81 and 82 on the disc 16 start past the respective pickup cells 89, 88 and 87, the pulse signals they generate will be delivered to their respective pulse generator 122, 121 and 116 circuits via the conduits 120, 119, 115. But, because the pulse generators 121 and 122 are inoperative due to the absence of their enabling gate pulses, respectively, from the pulse generators 131 and 136, the pulse generator 116 is the only one of these three that is active. The pulse generator 116 delivers a pulse to the pulse counter 117 for each 9's pulse $pr1$ received via the conduit 115. (In Fig. 8, in horizontal rows I, III and V the pulses which cross the dashed lines I'', III'' and II'' only are counted by the respective pulse counters 117, 123 or 124.) The pulse counter 117 then counts the pulses $pr1$ produced by the 9's registering marks 82 preceding the letter "A" of the disc 16 and at the letter "I" of said disc 16.

When the second 9's registering pulse $pr1$ produced by the mark 82 opposite the letter "I" of the disc 16 has been counted by the pulse counter 117, the 9's comparator 127 operates and causes the pulse generator 131 to deliver the 9's gate pulse $pg2$ (horizontal row III) to the pulse generator 121 via the conduit 132. The 9's gate pulse $pg2$ from the pulse generator 131 activates the pulse generator 121 (refer to Fig. 8, horizontal row III) so that all 3's pulses $pr2$ generated by the code marks 81 of disc 16 between the letters "I" and "R" may be counted by the pulse counter 123. Therefore, the pulse counter 123 counts the 3's pulses created by the code marks 81 on the disc 16 at the letters "I," "L," and "O," making three pulses, one more than was counted by the pulse counter 111 (rows III and IV of Fig. 8). When the 3's pulse at "O" has been counted, the pulse generator 122 is activated by the 3's gate pulse $pg3$ (row V) and may count all of the unit pulses $pr3$ between "O" and "R." Therefore, it counts the 1's pulses created by the code characters 80 at "O," and "P," making one more pulse than was originally counted by the pulse counter 113 (row VI). At the instant the pulse created by code mark 80 at letter "P" of the disc 16 is counted, the pulse generator 141 is activated and the switch initiating pulse SIP (row VII of Fig. 8) is generated and delivered to the row switches 143, 144 and 145 which are connected by the conduit 146 to the pulse generator 141.

To go back a bit, during the time the cells 51, 52 and 53 of Fig. 3 have been generating selecting pulses from tape 10 and setting up their respective pulse counters 113, 111 and 109, row selecting pulses have been generated by the cell 54 of Fig. 3 and delivered via the conduit 101 to the three-row activators 105, 106 and 107 (Fig. 2*b*). For the lower case letter "p," it will be noted that the row selecting signal group 60 of the tape 10 consists of two signals. The pulses corresponding to these signals ($p4$ in row VIII of Fig. 8) have been received via the conduit 101 by the row activators 105, 106 and 107 and the second row activator 106 has been energized.

In Fig. 8 the row selecting pulses $p4$ are shown on row VIII. In rows IX, X and XI of Fig. 8, the activation of a row switch is shown by a step-up in the respective solid lines IX', X' and XI'. When the first row pulse ($p4$ in row VIII) is received, the row 1 is activated and a step-up is shown ($p5$ in row IX). When the second row pulse ($p4$ in row VIII) is received, it creates a deactivating pulse as shown by a step-down $p6$ in row IX and row 2 is activated as shown by a step-up $p7$ in row X of Fig. 8. This activation allows the switch initiating pulse SIP transmitted from the pulse generator 141 via the conduit 146 to activate the second row switch 144. The row switches 143, 144 and 145 corresponding to the row activators 105, 106 and 107, respectively, are connected to the lamps 150, 151 and 152 by the conduits 153, 154 and 155, respectively.

Hence, when the second row switch 144 is activated, a pulse generator 147 connected by the conduits 148 and 149 to the row activators 105, 106 and 107 and row switches 143, 144, 145 is allowed to discharge through the lamp 151, via a conduit 154, lighting the lamp 151 and giving the light pulse PL in row XII of Fig. 8. When the second row lamp 151 has been lighted, the small character "p" on the type disc 16 will be in the proper position and the image of the letter "p" will be projected on the sensitized material 18 by the lamp 151.

When the pulse generator 147 discharges into any one of the lamps 150, 151 or 152, it delivers an extinguishing voltage to all of the row activators 105, 106, 107 via the conduit 148 which resets them in preparation for the next group of row selecting signals for the next character to be printed.

The operation of the 9's, 3's and 1's comparators 127, 133 and 138*a* is such that after they have delivered initiating pulses to their respective pulse generators 131, 136 and 141, they are inactivated until the reset signals from the master type disc 16 have been received and acted upon by the reset circuits 156, 157 and 158 which are connected, respectively, by the conduits 159, 160 and 161 to the conduits 115, 119 and 120 from the respective amplifiers 95, 96 and 97. Therefore, only one character can be printed during one revolution of the master type disc 16.

The reset circuits 156, 157, 158 are connected, respectively, by the conduits 156*a*, 157*a*, 158*a* to the comparators 127, 133 and 138*a*, respectively.

The pulses generated by the pulse generators 131, 136 and 141 are connected by the conduits 162, 163, 164 to the respective reset circuits 165, 166, 167. The latter are connected by the conduits 168, 169 and 170 to the respective pulse counters 109, 111 and 113. Said pulses, acting through the reset circuits 165, 166 and 167, serve to reset the pulse counters 109, 111 and 113. The counting circuits of said pulse counters 109, 111 and 113 are then ready to receive new selecting pulses from tape 10 during the reset period of the pulse counters 117, 123 and 124.

In the system of selecting and registering signals just described, a system of multiples of threes was selected as most convenient for the purpose of explaining the operation of the invention. Where the system is to be applied to other problems, a counting system based upon this principle could be devised in which any number of principal sectors may be composed of any number of subsectors which in turn might be composed of any number of sub-subsectors, etc., within the limits of circuits or mechanisms to handle the counting. The electronic system just described can also be transformed into a mechanical system.

*Transverse translation mechanism and projection optical system*

(Figs. 1, 2*a*, 2*b*, 3*a*, 3*b*, 4)

Figures 4, 5, 6:
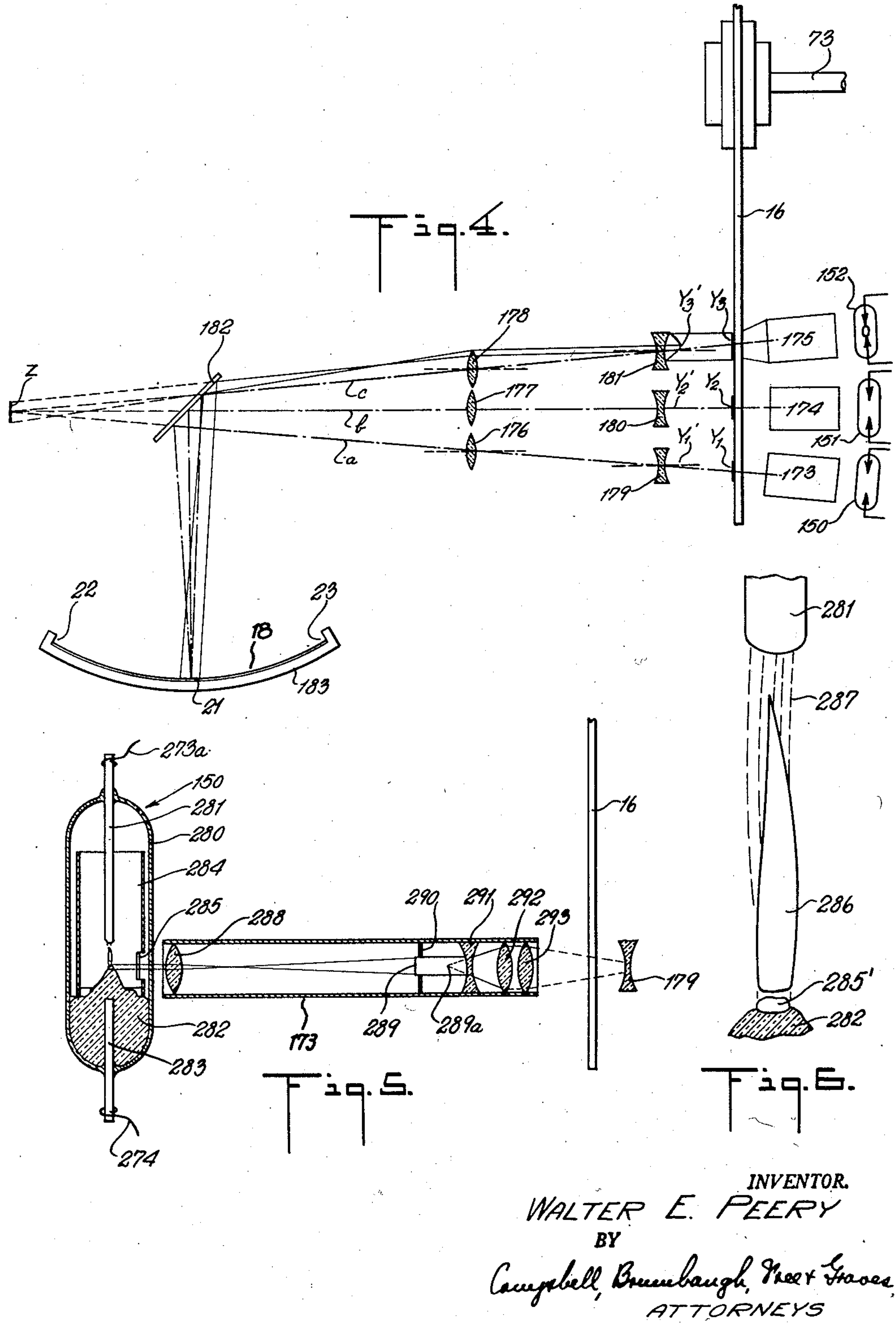
Fig. 4 shows the optical system involved in the projection of characters onto the photosensitive film.
Fig. 5 shows details of the printing lamp and the optical system for collecting and focusing the light therefrom.
Fig. 6 shows the physical characteristics of the light generated by the printing lamp.

Figs. 2*a*, 2*b*, and 4 together show in simplified form the mechanism for positioning the light projected through the characters 19 in a line on to the sensitized material 18. This is shown in Fig. 1 as the transverse translation mechanism 20 (Fig. 1).

The master type disc 16 (Fig. 2*b*) is rotated by the shaft 73 of the motor 29 which also has an extension shaft 171 to which is attached the tape feed mechanism 24 of Figs. 1 and 2.

The optical paths between the lamps 150, 151 and 152 and the sensitized material 18 are shown in detail in Fig. 4. These paths include the printing lamp optical systems, the master type disc 16 on which the negative image (transparency) of the character to be projected exists at the locations $Y_1$, $Y_2$, $Y_3$, a focusing lens system 176, 177, 178 and 179, 180, 181 and a mirror 182 on to which light is projected by the respective lens systems. The image of the character at location $Y_2$, for example, is focused and directed upon the film 18 at location 21 through the medium of the lenses 180 and 177 and the mirror 182.

A virtual and reduced image of a character at the location $Y_1$, $Y_2$ or $Y_3$ is created at the position $Y_1'$, $Y_2'$ or $Y_3'$ by a suitable concave lens 179, 180 or 181, respectively. The reduced virtual image at the position $Y_1'$, $Y_2'$ or $Y_3'$ is enlarged and made real at the position "Z" by a suitable convex lens 176, 177 or 178, respectively. The center lines of the optical paths are designated *a, b* and *c* (Fig. 4).

The optical paths and the negative characters on the master type disc 16 are so arranged that the projection of characters 19 in any of the character rows would be focused upon the spot Z, if the mirror 182 were removed. By inserting the mirror 182 and adjusting its angle, this spot of common focus can be shifted from one edge 22 of the sensitized material 18 to its other edge 23. The film 18 is given a curved shape and so held by a guide 183 (Figs. 2*a* and 4) to enable accurate focus at any point in any transverse line between the edges 22 and 23.

To effect this, the angle of the mirror 182 may be adjusted by movement of sector gear 184 (Fig. 2*a*) which carries a shaft 185 on which the mirror 182 is fixed. The sector gear 184 is moved (Fig. 3*b*) through a pinion 186 which in turn is actuated by a ratchet gear 187. Movement of the ratchet gear 187 is accomplished by activation of a solenoid winding 188 which operates an armature 189 and a pawl 190. The ratchet gear 187 is held against the returning action of the spring 191 by means of a pawl 192. The pawl 192 may be released by a solenoid 193 to return the common focus to the line beginning point at the edge 22.

Figure 3B:
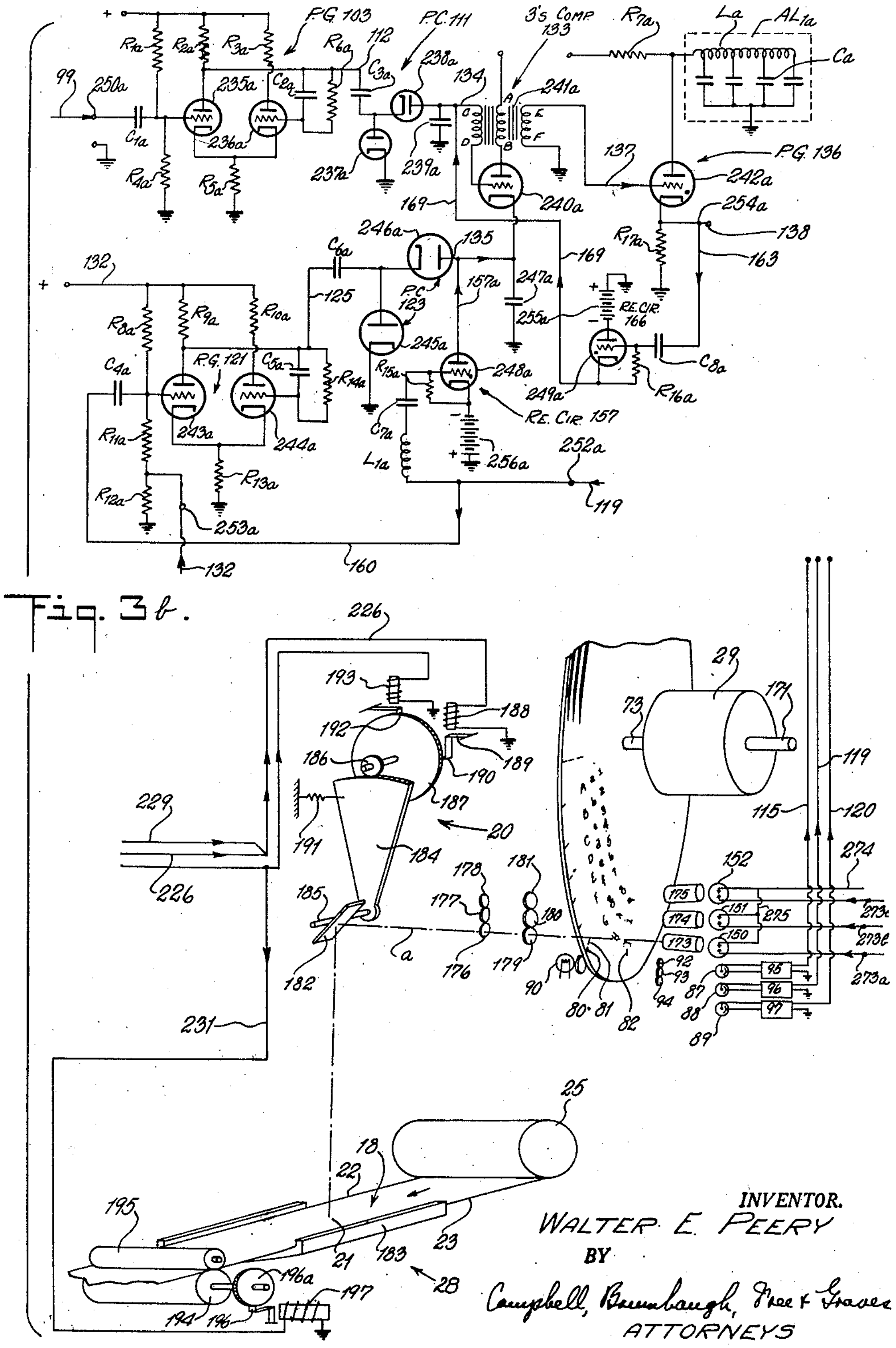

Figure 3*b* also shows the exciting lamp 90, and the lens systems 92, 93 and 94 by means of which the registering marks 80, 81 and 82 on the periphery of the master type disc 16 may be caused to influence the registering pulse generating cells 87, 88 and 89.

*Longitudinal translation*

(Fig. 3*b*)

Fig. 3*b* also shows the longitudinal translation mechanism 28 of Fig. 1 in detail. The film 18 unwinds from the unexposed reel 25 and passes across the guide 183 through the drive and idler rollers 194 and 195 to a rewind reel (not shown). The movement of the film 18 is accomplished by the drive roller 194 and the idler 195. The roller 194 is caused to rotate by the action of the pawl 196 and the ratchet **196*a*, which in turn is actuated by the solenoid winding 197. One or more operations of the pawl 196** move the film longitudinally in the direction of the arrow in Fig. 3*b* to provide spacing between lines of the printed matter exposed on the film 18. The drive roller 194 may cause the movement of the film by friction between the roller 194, the film 18, and the idler 195 as shown in this form of the invention. Optionally, the drive roller 194 may be equipped with teeth (not shown) which would engage slots (not shown) in the sensitized film 18.

Also, instead of the exposed sensitized material 18 being re-wound on a reel (not shown), the exposed material may be delivered directly into developing and other processes necessary to render it usable.

*Flow diagram of justifying system*

(Fig. 2)

Fig. 2 also shows in block diagram form the electronic and electrical circuits which compute and control line justifying. These justifying system circuits receive all of their initiating signals from the code tape 10 of Figs. 2 and 3.

The antecedent character space pulses derived from the code marks 56 on the tape 10 and generated by the cell 46 and amplified by the amplifier 70 of Figs. 2 and 3 are delivered by a conduit 198 to a pulse generator 199. For each of such pulses received, the pulse generator 199 generates a pulse of suitable shape and amplitude to be counted by the pulse counter 200, which is connected to it by a conduit 201.

As each line of printed matter is scanned, the pulse counter 200 counts the total character space pulses generated by the cell 46 in the line, which in turn is proportional to the space occupied by the characters in that line. This space is counted in terms of a generated voltage in the output of the pulse counter 200. The total space occupied by the characters of a line to be printed is compared to the total width of the line or column and the difference between these two emerges as a voltage generated by a voltage generator 202 connected to the pulse counter 200 by conduit 203. This difference voltage is proportional to the amount of space which is to be divided among the word spaces in the line of characters on the tape 10 to be printed on the film 18.

The antecedent word space signals derived from the code marks 62 and generated by the cell 47 of Fig. 3 are amplified by the amplifier 71 and applied through conduits 204 and 205 to a step relay 206 which advances one step for each word space signal received. The step relay 206 is connected by a conduit 207 to the voltage generator 202 and the action of the step relay 206 is to divide the difference voltage of the voltage generator 202 proportionally to the number of word spaces in a line. A spacing selector 208 is connected by a conduit 209 to the step relay 206 and it selects either a standard word space or the word space determined by the step relay 206.

Should the cell 47 in Fig. 3 receive an automatic spacing initiating signal 64 of Fig. 3, that signal also, through the conduit 204, will act upon a spacing initiator 210 which, through the conduit 211, will cause the spacing selector 208 to select the word space as determined from the step relay 206. Otherwise, the word spacing will be according to the predetermined standard spacing. The spacing voltage which the spacing selector 208 has selected is fed through a conduit 213 to a spacing storage device 212 where it is stored until the line for which the spacing has been selected begins to be printed.

A transfer relay circuit 214, connected by a conduit 215 to the spacing storage circuit 212, transfers the spacing storage from the preliminary spacing determining circuit elements 199, 200, 202, 206 and 208 to the printing spacing circuit elements consisting of a switch 216, a conduit 217, a pulse generator 218, a conduit 219, a pulse counter 220, a conduit 221, a comparator 222, a conduit 223, and an amplifier 224 as will be described.

There are two identical spacing storage elements in spacing storage device 212 which is connected to the amplifier 224 by a conduit 225. Each goes through a cycle of storing spacing information during the antecedent scanning of one line of the tape code then delivering the stored information to spacing selector 208 during the printing of that line. At any instant, one element of the spacing storage device 212 is storing the information for the line next to be printed while the other element delivers previously stored information via the conduit 225 for the line being printed. The function of each changes from storing to delivering or vice versa at the beginning of printing each new line. These elements will be described in detail later.

The character space pulses initiated by the code marks 56 of the tape 10, generated by the cell 50 (Fig. 3) and amplified by the amplifier 74 are connected by the conduit 226 directly to the solenoid 188 (Fig. 2*a*) so that on each pulse the pawl 189 will be pulled down once and the angle of the mirror 182 adjusted to move the focus point 21 a unit distance across the width of the film 18 from the side 23 towards the side 22.

When a word space pulse initiated by a code mark 62 of the tape 10 is generated by cell 49, the signal is amplified by the amplifier 73 and connected by a conduit 227 to the switch 216 (Fig. 2) which is actuated thereby. The switch 216 through conduit 217 allows pulse generator 218 to begin generating a series of pulses. These pulses are connected by a conduit 228 to an appropriate amplifier 228*a* and from thence through a conduit 229 to the conduit 226 and to the coil 188 (Fig. 2*a*) of the transverse translation mechanism. Thus the pulses from amplifier 228*a* are in multiple with the character space pulses previously described and delivered via the conduit 226 from the amplifier 74. As such, they are delivered via the conduit 226 to the solenoid winding 188 (Fig. 2*a*) and cause the operation of the pawl 189 in the same manner to cause an advancement of the spot 21 of Fig. 2*a* across the film 18 from the side 23 towards the side 22.

The pulse counter 220 (Fig. 2) counts the pulses generated by the pulse generator 218. The comparator 222 compares the space being inserted by the action of the pulse generator 218 with the spacing previously computed and set up and stored by the spacing storage circuit 212. When the predetermined spacing has been reached, the comparator 222, via a conduit 230, deenergizes the switch 216, causing the pulse generator 218 to cease the activation of the coil 188 of the transverse translation mechanism 20 of Fig. 1.

When a line space signal initiated by a code mark 63 of the tape 10 is generated by the cell 48 of Fig. 3 and is amplified by the amplifier 72 (Fig. 2) and delivered by a conduit 231 to the solenoid 197 (Fig. 2*a*), the longitudinal translating mechanism 28 is actuated and the film 18 is moved longitudinally to prepare for a new line of printed matter thereon. In effect, the line signals via the conduit 231 from the amplifier 72 are connected to the solenoid 197 of Fig. 2*a* to actuate the pawl 196. The line signals are also transmitted from the conduit 231 by a conduit 231*a* to the solenoid 193 (Fig. 2*a*) causing its pawl 192 to disengage the ratchet wheel 187 and permit the mirror 182 to return to its initial position under the influence of the spring 191.

The line signals from the amplifier 72 are also transmitted by a branch conduit 232 (Fig. 2) to the pulse counter 200, the step relay 206, the spacing initiator 210 and to transfer relay 214, and they serve to reset the pulse counter 200, the step relay 206, and the spacing initiator 212, and also to transfer from one element to the other of the spacing storage circuit 212 through transfer relay 214.

*Schematic circuit diagrams of printing control circuits*

Figure 3C:
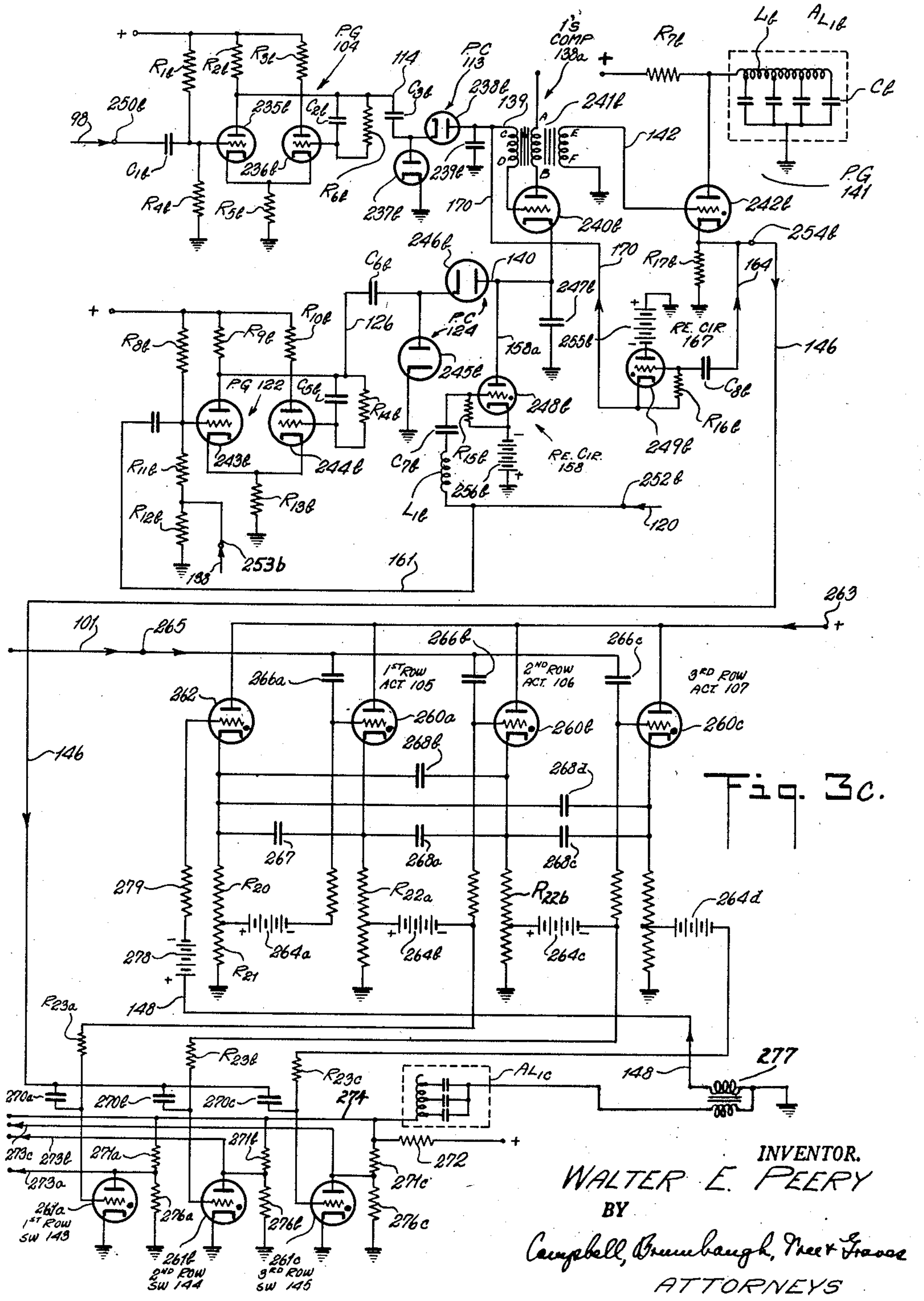

(Figs. 3*a*, 3*b*, 3*c*)

Figs. 3*a*, 3*b* and 3*c* show schematically the electronic circuits contained in Figs. 2, 2*a* and 2*b*.

Referring to Figs. 3*a* and 2, the elements in Fig. 3*a* corresponding to the blocks in Fig. 2, are as follows:

Vacuum tubes 235 and 236 and associated components (resistances $R_1$–$R_6$ inclusive and condensers $C_2$ and $C_3$ inclusive) correspond to pulse generator 102.

Diodes 237 and 238 and condenser 239 correspond to pulse counter 109.

Vacuum tube 240 and transformer 241 correspond to comparator 127.

Thyratron 242 and associated components (resistances $R_7$ and artificial line $AL_1$) correspond to pulse generator 131.

Vacuum tubes 243 and 244 and associated components (resistances $R_8$–$R_{14}$ inclusive and condensers $C_4$ and $C_5$) correspond to pulse generator 116.

Diodes 245 and 246 and condensers $C_6$ and 247 correspond to pulse counter 117.

Thyratron 248 and associated components inductance $L_1$, condenser $C_7$ and resistance $R_{15}$ correspond to reset circuit 156.

Thyratron 249 and associated components (resistances $R_{16}$, $R_{17}$ and condenser $C_8$) correspond to reset circuit 165.

Similarly, referring to Figs. 3*b* and 2*a*, the elements in Fig. 3*b* corresponding to the blocks in Fig. 2*a* are as follows:

Vacuum tubes 235*a* and 236*a* and associated components (resistances $R_{1a}$—$R_{6a}$ and condensers $C_{2a}$—$C_{3a}$) correspond to pulse generator 103.

Diodes 237*a* and 238*a* and condenser 239*a* correspond to pulse counter 111.

Vacuum tube 240*a* and transformer 241*a* correspond to comparator 133.

Thyratron 242*a* and associated components (resistances $R_{7a}$ and artificial line $AL_{1a}$) correspond to pulse generator 136.

Vacuum tubes 243*a* and 244*a* and associated components (resistances $R_{8a}$—$R_{14a}$ and condensers $C_{4a}$—$C_{5a}$) correspond to pulse generator 121.

Diodes 245*a* and 246*a* and condensers $C_{6a}$ and 247*a* correspond to pulse counter 123.

Thyratron 248*a* and associated components (inductance $L_{1a}$, condenser $C_{7a}$ and resistance $R_{15a}$) correspond to reset circuit 157.

Thyratron 249*a* and associated components (resistances $R_{16a}$ and $R_{17a}$ and condenser $C_{8a}$) correspond to reset circuit 166.

Similarly, referring to Figs. 3*c* and 2*b*, the elements in Fig. 3*c* corresponding to the blocks in Fig. 2*b* are as follows:

Vacuum tubes 235*b* and 236*b* and associated components (resistances $R_{1b}$–$R_{6b}$ inc. and condensers $C_{2b}$–$C_{3b}$ inclusive) correspond to pulse generator 104.

Diodes 237*b* and 238*b* and condenser 239*b* correspond to pulse counter 113.

Vacuum tube 240*b* and transformer 241*b* correspond to comparator 138*a*.

Thyratron 242*b* and associated components (resistance $R_{7b}$ and artificial line $AL_{1b}$) correspond to pulse generator 141.

Vacuum tubes 243*b* and 244*b* and associated components (resistances $R_{8b}$–$R_{14b}$ inc. and condensers $C_{4b}$, $C_{5b}$) correspond to pulse generator 122.

Diodes **245*b* and 246*b* and condensers $C_{6b}$ and 247*b* correspond to pulse counter 124**.

Thyratron **248*b* and associated components (inductance $L_{1b}$, condenser $C_{7b}$ and resistance $R_{15b}$) correspond to reset circuit 158**.

Thyratron **249*b* and associated components (resistances $R_{16b}$, $R_{17b}$ and condenser $C_{8b}$) correspond to reset circuit 167**.

The 9's, 3's or units selecting pulses generated by the respective cells 53, 52 or 51 of Fig. 3 are connected by the respective conduits 100, 99 and 98 to the respective terminals 250, 250a, 250b. The pulses, respectively, are coupled through the respective condensers $C_1$, $C_{1a}$, $C_{1b}$, to the grids of respective vacuum tubes 235, **235*a*, 235*b*. The vacuum tubes 235, 236 and 235*a*, 236*a*, and 235*b* and 236*b*, with their respective associated components $R_1$, $R_2$, $R_3$, $R_4$, $R_5$, $C_2$, $C_3$, $R_6$, $R_{1a}$, $R_{2a}$, $R_{3a}$, $R_{4a}$, $R_{5a}$, $C_{2a}$, $C_{3a}$, $R_{6a}$ and $R_{1b}$, $R_{2b}$, $R_{3b}$, $R_{4b}$, $R_{5b}$, $C_{2b}$, $C_{3b}$, $R_{6b}$ comprise three similar multivibrator circuits each of which generates one pulse for each pulse signal received at the respective terminals 250, 250*a* and 250*b***. The function of each is to generate pulses of uniform amplitude and shape for the operation of following circuits.

As each pulse is received from the respective multivibrator circuit and coupled to the respective pulse counter 109, 111 or 113 through the respective condenser $C_3$, $C_{3a}$ or $C_{3b}$ via the respective conduit 110, 112 or 114, the voltage on the respective condenser 239, **239*a* or 239*b* is increased in the negative direction with respect to ground by a definite incremental amount. The respective vacuum tubes of each multivibrator circuit and the diodes of the respective pulse counters 109, 111 and 113 are connected in such a way that the incremental changes in voltage of the respective condensers 239, 239*a* and 239*b* make the grids of the respective vacuum tubes 240, 240*a* and 240*b* more negative with respect to their cathodes. At the beginning of a cycle of counting, the grid voltages of the vacuum tubes 240, 240*a* and 240*b* relative to their cathode voltages are at values which just prevent plate current flow. Under these conditions, the incremental voltage applied to the condenser 239, 239*a* or 239*b* drives the relative grid to cathode voltage of the corresponding tube 240, 240*a* or 240*b*** more negative and farther below the plate current cut-off point.

This condition is illustrated in rows II, IV and VI of Fig. 8, in which the solid lines II′, IV′ and VI′ represent the absolute grid-to-cathode potentials with respect to the plate current cut-off value of grid-to-cathode potential represented by the dashed lines II″, IV″, VI″, respectively. The respective negative increments in grid-to-cathode voltages are represented by *p1′*, *p2′* and *p3′*.

The registering pulses generated by the cells 87, 88 and 89 (Fig. 7) are applied, respectively, by the conduits 115, 119 and 120 to the respective terminals 252 (Fig. 3*a*), **252*a*** (Fig. 3*b*), **252*b*** (Fig. 3*c*). These registering pulses being of short duration are composed of relatively high frequency components and will not pass through the low pass filters consisting of the respective choke coils $L_1$, $L_{1a}$, $L_{1b}$, the condensers $C_7$, $C_{7a}$, $C_{7b}$ and the resistors $R_{15}$, $R_{15a}$, $R_{15b}$. These pulses, however, will be applied to the grids of the respective vacuum tubes 243, **243*a* and 243*b* via the conduits 159, 160 and 161 through the high pass filters consisting, respectively, of condensers $C_4$, $C_{4a}$ and $C_{4b}$ and the resistors $R_{11}$, $R_{12}$ and $R_{11a}$, $R_{12a}$ and $R_{11b}$, $R_{12b}$. The vacuum tubes 243, 244 and 243*a*, 244*a* and 243*b*, 244*b*, with their associated circuit components, constitute multivibrator circuits identical in function and performance, respectively, to that of the vacuum tubes 235, 236 and 235*a*, 236*a* and 235*b*, 236*b***. In the case of the selecting circuit of Fig. 3*a*, the multivibrator circuit comprising the tubes 243 and 244 will generate one pulse for each of the 9's registering pulses received from the cell 87 (Fig. 7) which will appear at the terminal 252 from the conduit 115.

In the case of the selecting circuit of Fig. 3*b*, however, first the gate pulse from the pulse generator 131 in Fig. 2 (thyratron 242, Fig. 3*a*) must appear at the terminal 254, Fig. 3*a*, and be delivered via the conduit 132 to the terminal **253*a***, Fig. 3*b*, to render the selecting circuits of the latter figure operative. Then the gate pulse from the pulse generator 136 in Fig. 2*a* (thyratron **242*a***, Fig. 3*b*) must appear at the terminal **254*a*** in Fig. 3*b*, and be delivered via the conduit 138 to the terminal **253*b*** in Fig. 3*c*, to render the selecting circuit of the latter figure operative, so that the switch initiating pulse SIP from the pulse generator 141 in Fig. 2*b* (thyratron **242*b*** in Fig. 3*c*) will appear at the terminal **254*b*** (Fig. 3*c*). In other words, the multivibrator tubes **243*a*, 244*a* cannot generate pulses until the 9's pulse from the pulse generator 131 has been delivered via the conduit 132 and the multivibrator tubes 243*b*, 244*b* cannot generate pulses until the 3's pulse from the pulse generator 136 has been delivered via the conduit 138**.

In Fig. 8, the rows I, III and V show the time sequence of the registering pulse counting circuits. In these illustrations, the dashed lines I″, III″ and V″ represent the critical grid-to-cathode voltages of the respective multivibrator tubes 243, **243*a*, 243*b*** which must be exceeded by the amplitudes of the registering pulses in order for a pulse to activate the respective multivibrator and be counted. In the circuit of Fig. 3*a*, the grid-to-cathode voltage is arranged so that all of the 9's registering pulses *pr1* act on the multivibrator 243 as illustrated in row I of Fig. 8. Here, the peaks of all of the registering pulses are above the critical value of the dashed line I″.

The rows III and V of Fig. 8 show how the gate pulses *pg2* and *pg3*, respectively, superimposed on the registering pulses *pr2* and *pr3*, respectively, give the latter sufficient amplitude to cause the multivibrator tubes **243*a* and 243*b***, respectively, to operate. The registering pulses preceding and following the respective gate pulses *pg2* and *pg3* do not have sufficient amplitude of themselves to cause the multivibrator tubes **243*a* and 243*b*** to operate.

The pulses generated by the respective multivibrators comprising the tubes 243, 244 or **243*a*, 244*a* or 243*b*, 244*b* are applied, respectively, to the pulse counting circuits consisting, respectively, of the diodes 245, 246 or 245*a*, 246*a* or 245*b*, 246*b* and the condensers 247, 247*a*, or 247*b*. These pulse counting circuits each are identical in function and performance to that consisting of the respective tubes 237, 238 or 237*a*, 238*a* or 237*b*, 238*b* and condensers 239, 239*a* or 239*b*. As each of such pulses is received from the respective multivibrator and coupled to the respective pulse counter through the condenser $C_6$, $C_{6a}$ or $C_{6b}$, the voltage on the corresponding condenser 247, 247*a* or 247*b*** is increased in the negative direction with respect to ground by a difinite incremental amount.

It can be seen that as the charge on the condenser 247 or **247*a* or 247*b* becomes more negative with respect to ground through the operation of the respective counting circuit, the cathode potential of the corresponding tube 240, 240*a* or 240*b* is caused to approach the respective grid potential. The effect of this is to decrease the relative grid-to-cathode bias voltage of the respective tube 240, 240*a* or 240*b*. The incremental changes in voltage on the respective condensers 239 and 247 or 239*a* and 247*a* or 239*b* and 247*b* due to each pulse received are approximately equal so that when the same number of pulses have been counted at the cathode as were originally counted at the grid, the grid bias of the respective vacuum tube 240 or 240*a* or 240*b*** will be just below its plate current cut-off potential. This is approximately the grid-to-cathode voltage relationship which existed before selecting signals were received.

The next registering pulse counted by the pair of diode tubes 245, 246 or **245*a*, 246*a* or 245*b*, 246*b* and the corresponding condenser 247 or 247*a* or 247*b* will cause the potential on the condenser to go further in the negative direction and result in a grid-to-cathode relative potential which is within the plate current conducting range of the respective tube 240, 240***a* or 240*b*. Current, therefore, begins to flow between its plate and cathode.

Referring again to rows II, IV and VI of Fig. 8, *pr*1', *pr*2' and *pr*3' represent positive increments in grid-to-cathode voltage corresponding to counts of registering pulses. It will be seen that when the said increments exceed the corresponding negative increments *p*1', *p*2', *p*3' by one, the grid-to-cathode voltages exceed the cut-off values so that plate current begins to flow in the tubes 240, 240*a* or 240*b*.

The respective vacuum tubes 240, 240*a* or 240*b* and associated transformers 241, 241*a* or 241*b* each constitute a blocking oscillator circuit which will go through one cycle of oscillation as soon as plate current in any degree is initiated in the corresponding tube. One cycle of oscillation, therefore, occurs in the circuit of the corresponding tube 240, 240*a* or 240*b* at this time. This oscillation is of relatively short time duration to accomplish the purposes desired.

A voltage induced in the winding E–F of the transformer 241, 241*a* or 241*b* during the single oscillation of the tube 240, 240*a* or 240*b*, respectively, is applied to the grid of thyratron 242, 242*a* or 242*b*, respectively, and renders it conductive.

Connected to the plates of such thyratrons are the respective networks $AL_1$, $AL_{1a}$ or $AL_{1b}$ consisting, respectively, of an arrangement of condensers C, $C_a$ or $C_b$ and inductances L, $L_a$, $L_b$, as shown. Each network has been charged to a positive potential with regard to ground through the resistor $R_7$, $R_{7a}$ or $R_{7b}$. The characteristics of the networks AL, $AL_{1a}$ or $AL_{1b}$ are such that, when each is discharged into an impedance equal to its characteristic impedance, it will develop a pulse of voltage substantially constant in amplitude and of a time duration directly determined by the values of its condensers and inductors.

When the thyratron 242, 242*a* or 242*b* is made conductive, the corresponding network $AL_1$, $AL_{1a}$ or $AL_{1b}$, respectively, discharges through it into an impedance consisting of the resistor $R_{17}$, $R_{17a}$ or $R_{17b}$, respectively, and apparatus connected externally to the terminal 254, 254*a* or 254*b*, respectively. These impedances are equal, respectively, to the characteristic impedances of the respective networks $AL_1$, $AL_{1a}$ or $AL_{1b}$ and, therefore, voltage pulses of constant amplitude of a predetermined time duration are generated between the respective terminals 254, 254*a* or 254*b* and ground. The pulse thus generated at the terminal 254 is the nine-unit gate pulse *pg*2 in row III of Fig. 8 previously described in connection with the pulse generator 131 of Fig. 2; that at the terminal 254*a*, the 3's gate pulse *pg*3 in row V of Fig. 8 described in connection with the pulse generator 136 of Fig. 2*a*; and that at the terminal 254*b* the switch initiating pulse SIP in row VII of Fig. 8 described in connection with the pulse generator 141 of Fig. 2*b*, depending upon the particular selecting block the circuit is being used in. Thus, the pulse generated at the terminal 254 of Fig. 3*a* has a duration equal to the time required for nine register marks to pass the pickup point. That generated at the terminal 254*a* of Fig. 3*b* has a duration equal to three register marks.

After discharge, the pulse forming networks $AL_1$, $AL_{1a}$, $AL_{1b}$ are recharged from a positive potential source through the respective resistors $R_7$, $R_{7a}$ or $R_{7b}$.

When the blocking oscillator tube 240, 240*a* or 240*b* completes its single cycle of operation, a very high negative charge remains on the condenser 239, 239*a* or 239*b*, respectively, due to grid current flow that has occurred during the cycle. The negative charge on the condenser 247, 247*a* or 247*b*, which existed before the beginning of the oscillation, is neutralized by the flow of current from the plate to the cathode of the tube 240, 240*a* or 240*b*, respectively. All current flowing from the cathode of the corresponding tube beyond that required to neutralize the charge on the condenser 247, 247*a* or 247*b*, respectively, flows to ground through the diode pairs 245, 246 or 245*a*, 246*a* or 245*b*, 246*b*, respectively. The cathode of the tube 240, 240*a* or 240*b* at the end of a cycle is then at nearly ground potential and a condition of grid blocking due to the high negative grid potential exists. It is now necessary to restore the charges on the respective grid and cathode condensers 239 and 247 or 239*a* and 247*a* or 239*b* and 247*b* to their initial states to prepare for the counting operations for the next character.

The proper initial voltage is restored to the respective grid condenser 239, 239*a*, 239*b* by the respective reset circuit consisting of the thyratron 249, 249*a* or 249*b* and its associated components; the resistor $R_{16}$, $R_{16a}$ or $R_{16b}$, the condenser $C_8$, $C_{8a}$ or $C_{8b}$ and the plate battery 255, 255*a* or 255*b*.

The plate battery 255, 255*a* or 255*b* has its negative terminal connected respectively to the plate of the tube 249, 249*a* or 249*b* and its positive terminal grounded. Its potential is equal to the initial voltage to which it is desired to charge the respective grid condenser 239, 239*a* or 239*b*. Since the charge on the respective grid condenser 239, 239*a* or 239*b* at the end of the oscillation cycle of respective tube 240, 240*a* or 240*b* is very much more negative than the potential of the respective battery 255, 255*a* or 255*b*, the plate of the respective tube 249, 249*a* or 249*b* at the end of its oscillation cycle, is positive with respect to its respective cathode. This is the condition necessary for current flow from the plate to the cathode of the respective tubes 249, 249*a*, 249*b*.

When the gate pulse or switch-initiating pulse is developed across the resistor $R_{17}$, $R_{17a}$ or $R_{17b}$ a part of each such pulse is applied to the control grid of the respective tube 249, 249*a* or 249*b* making it conductive. When such tube 249, 249*a* or 249*b* is made conductive, its battery 255, 255*a* or 255*b* is in effect connected to respective condenser 239, 239*a* or 239*b* and such condenser thereby assumes the potential of the battery 255, 255*a* or 255*b* as the case may be. The tube 249, 249*a* or 249*b* then will become non-conductive by de-ionization as soon as its associated condenser 239, 239*a* or 239*b* reaches the same potential as the associated battery 255, 255*a* or 255*b* and current between them ceases to flow.

Re-establishment of the initial charges on capacitors 247, 247*a* or 247*b* occurs as follows: When the reset signals 84, 85 and 86 on the master type disc 16 are scanned, a signal is generated by each of cells 87, 88 and 89 and their amplifiers 95, 96 and 97, respectively. These signals each have comparatively low frequency components which will easily pass via the respective conduits 115, 119, 120 through the respective filters $L_1$, $C_7$, $R_{15}$, and $L_{1a}$, $C_{7a}$, $R_{15a}$ and $L_{1b}$, $C_{7b}$, $R_{15b}$, and cause the respective gas tubes 248 and 248*a* and 248*b* to become conductive. This occurs simultaneously in each of said gas tubes because of the location of the reset signals 84, 85 and 86 on master disc 16.

The gas tubes 248, 248*a*, 248*b* have their cathodes connected to the respective negative terminals of the batteries 256, 256*a* or 256*b*, the positive terminal of each of which is connected to ground. The potential of each battery 256, 256*a* and 256*b* is equal to the initial potential required, respectively, on each of the capacitors 247, 247*a* and 247*b* at the beginning of the counting sequence. Since the charge on the condensers 247, 247*a* or 247*b* is nearly zero at the end of the oscillation of the respective tube 240, 240*a* or 240*b*, the plate of the tube 248, 248*a* or 248*b* is positive with respect to its cathode.

When the gas tube 248, 248*a* or 248*b* becomes conductive, current flows from the respective condenser 247, 247*a* or 247*b* through the respective gas tube to ground until the potential of the condenser 247, 247*a* or 247*b*, as the case may be, is established equal to that of the corresponding battery 256, 256*a* or 256*b*. When the condenser charging currents cease to flow, ionization in the gas tubes 248, 248*a* or 248*b* will cease and they will become non-conductive.

The counting circuits are now restored to their initial states and are now ready for another sequence of counting and registering pulses.

When the blocking oscillator has completed its cycle and the initial charge has been replaced on condenser 239, additional 9's registering signals may come through the 9's registering signal pulse counter. These do not affect the 9's comparator circuit for the following reason: The charge on condenser 247 at the end of the blocking oscillator cycle is at nearly ground potential and, as a matter of fact, is slightly positive. (It may be made more positive for the purpose at hand by connecting a resistance in series with the cathode of diode 245 so that during the blocking oscillator cycle and heavy current flow from the cathode of vacuum tube 240 through diodes 246 and 245, to ground, a positive potential of the desired amount will be developed across condenser 247 and will drain off after the passage of the blocking oscillator cycle according to the well known RC law.) While the charge on condenser 247 is in this state, several 9's registering signals may be counted by the registering signal pulse generator and counters. The charge on condenser 247 will be made more negative by incremental amounts as before. The charge on condenser 247 will be such, however, that the available 9's registering signals that can be counted will not be sufficient to change its charge sufficiently to again cause conduction of blocking oscillator 240. Thus the 9's comparator can operate once and only once for each rotation of the disc.

*Schematic diagram of row-selecting circuits*

(Figs. 3*c* and 2*b*)

In Fig. 3*c* is also shown in schematic form the electronic circuits associated with the row-selecting function of the printing control. This is the circuit shown in flow diagram form in Fig. 2*b* and is the circuit which selects the printing lamp associated with the row in which the character 19 of the disc 16 to be printed is located. It also provides for the excitation of the proper lamps 150, 151 or 152.

Referring to Figs. 3*c* and 2*b*, the elements in Fig. 3*c* corresponding to the blocks in Figs. 2*b* are as follows:

Thyratron 260*a* and associated components to be described correspond to the first row activator 105.
Thyratron 260*b* and associated components to be described correspond to the second row activator 106.
Thyratron 260*c* and associated components to be described correspond to the third row activator 107.
Thyratron 261*a* and associated components to be described correspond to the first row switch 143.
Thyratron 261*b* and associated components to be described correspond to the second row switch 144.
Thyratron 261*c* and associated components to be described correspond to the third row switch 145.

Referring to Fig. 3*c*, the thyratron 262, in the initial condition of the circuit before row-selecting pulses are received, is in a conducting state. Plate current flows from the positive voltage supply connection 263 to its plate and through the cathode resistor $R_{20}$ to ground.

The thyratrons 260*a*, 260*b* and 260*c*, in the initial condition of the circuit, are not conducting. In series with the grid of each of these tubes is a bias battery 264*a*, 264*b* and 264*c* respectively. The potential of each of these batteries is greater than the amplitude of the row-selecting pulses generated by the cell 54 and amplified by amplifier 78 of Fig. 3. The row-selecting pulses from the amplifier 78 via the conduit 101 are connected to each of the grids of the thyratrons 260*a*, 260*b*, 260*c* through the terminal 265 and the capacitors 266*a*, 266*b* and 266*c*.

Conduction in the thyratrons 260*a*, 260*b* and 260*c* cannot be initiated by the row-selecting pulses unless the thyratron grid bias voltages are reduced to values less than the voltage amplitude of the row-selecting pulses. Such a condition exists in the grid bias voltage of the thyratron 260*a* initially. The voltage drop across the tapped portion $R_{21}$ of the resistor $R_{20}$ is effectively in series with the grid battery 264*a* and reduces the effective grid bias of the thyratron 260*a* by the amount of the voltage drop. Upon receipt of the first row-selecting pulse from the amplifier 78 via the conduit 101, the grid of the thyratron 260*a* will be raised above the value which initiates conduction and it will become conducting.

When conduction is initiated in the thyratron 260*a*, the potential of its cathode is raised from ground potential to a comparatively high positive potential. This change in potential is coupled to the cathode of the thyratron 262 through a condenser or capacitor 267, causing its cathode potential to be momentarily raised nearly to its plate potential, resulting in a stopping of plate current flow and de-ionization of the thyratron tube 262. The thyratron 262 is then in a non-conducting condition.

The conduction current in thyratron 260*a* causes a voltage drop through resistor $R_{22a}$. A portion of this voltage drop, that between the tap on the resistor $R_{22a}$ and ground, is effectively in series with the grid battery 264*b* of thyratron 260*b* and reduces the effective grid bias of the latter. Upon receipt of the second row-selecting signal from the amplifier 78 via the conduit 101, the grid potential of the thyratron 260*b* will be raised above the value which initiates conduction and it will become conducting.

The initiation of conduction in the thyratron 260*b* causes the potential of its cathode to change from ground potential to a comparatively high positive value. This change is potential is coupled to the cathode of the thyratron 260*a* through a condenser or capacitor 268*a* and causes its cathode voltage to be momentarily raised nearly to its plate potential, causing the thyratron 260*a* to cease conducting. This is a repetition of the process which caused the thyratron 262 to cease conducting.

The conduction current in the thyratron 260*b* causes a voltage drop through the resistor $R_{22b}$. A portion of this voltage drop, that between the tap on resistor $R_{22b}$ and ground is effectively in series with the grid battery 264*c* of the thyratron 260*c*. Upon receipt of the third row-selecting signal via the conduit 101, the grid potential of the thyratron 260*c* will be raised above the value which initiates conduction and it will become conducting.

The initiation of conduction in the thyratron 260*c* causes the potential of its cathode to change from ground potential to a comparatively high value. This change in potential is coupled to the cathode of the thyratron 260*b* through the capacitor or condenser 268*c* and causes its cathode voltage to be momentarily raised nearly to its plate potential, causing the thyratron 260*b* to cease conducting.

The process of row-selecting as described above is not limited to three rows or three selecting thyratrons 260*a*, 260*b* and 260*c* but may be continued through as many row-selecting circuits as may be desirable.

The bias batteries 264*b*, 264*c* and 264*d* are also connected via the resistances $R_{23a}$, $R_{23b}$, $R_{23c}$ to the grid circuits of thyratrons 261*a*, 261*b* and 261*c*, respectively. The grid circuits of these thyratrons are affected by the voltages developed by the bias batteries 264*b*, 264*c* and 264*d* and the voltages between the taps on the resistors $R_{22a}$, $R_{22b}$ and $R_{22c}$ and ground. Therefore, whenever the thyratron 260*a*, 260*b* and 260*c* is in a conducting state, the effective grid bias on the thyratron 261*a*, 261*b* or 261*c* associated therewith is reduced. Under these conditions, that thyratron is susceptible to a switch-initiating pulse applied at the terminal 254*b* which is connected via the conduit 146 and the condensers 270*a*, 270*b* and 270*c* to the grids of the tubes 261*a*, 261*b* and 261*c*.

The amplitude of the switch-initiating pulse applied at the terminal **254*b* is such that it will cause conduction in that one of the three thyratrons 261*a*, 261*b* or 261*c* whose grid bias has been reduced as described above but will not affect the others of these thyratrons 261*a*, 261*b* or 261*c*** whose grid bias has not been changed.

Rows VIII, IX, X and XI of Fig. 8 show graphically the time and sequence relationships between the row-selecting pulse and the grid cathode voltage for the thyratrons **261*a*, 261*b* and 261*c*. The dashed lines IX'', X'' and XI'' represent the critical grid-to-cathode voltage, above which conduction is initiated in the thyratrons 261*a*, 261*b* and 261*c*** respectively. The solid lines IX', X' and XI' in lines IX, X and XI represent the time sequence of the grid-to-cathode voltages.

The first row-selecting pulse *p*4 (row VIII) causes conduction in the thyratron **260*a* and causes the bias of the first row switch thyratron 261*a*** to be reduced by an increment *p*5 (row IX) so that it becomes susceptible to the switch-initiating pulse SIP in row VII which is to come later.

The second row-selecting pulse *p*4 (row VIII) causes the thyratron **260*a* to become non-conducting and so the bias on the first row switch thyratron 261*a*** increases by an increment *p*6 (row IX) and thus returns to normal. At the same time, the second row-selecting pulse *p*4 (row VIII) causes conduction in the thyratron **260*b* and causes the bias of the second row switch thyratron 261*b*** to be reduced by an increment *p*7 (row X) so that it becomes susceptible to the switch-initiating pulse SIP.

When the switch-initiating pulse SIP is applied to all three of the row switch thyratrons simultaneously, only the second row switch thyratron **260*b*** responds. In this case, the amplitude of the switch-initiating pulse SIP (row X) in combination with the reduced bias causes the grid-to-cathode voltage to go beyond the critical value.

The plates of the thyratrons **261*a*, 261*b* and 261*c* are connected through the resistors 271*a*, 271*b* and 271*c* to the pulse forming network $AL_{1c}$ which is of a similar type to the networks $AL_1$, $AL_{1a}$, $AL_{1b}$ described previously. The network $AL_{1c}$ is charged from a high potential source (not shown) through a resistor 272**.

In parallel with the resistors **271*a*, 271*b* and 271*c*, via the respective conduits 273*a*, 273*b* and 273*c* and the conduits 275 and 726**, Fig. 3*c*, are connected the printing lamps 152, 151 and 150 respectively (Fig. 3*b*).

After the row-selecting pulses have been received and the proper row activating thyratron **260*a*, 260*b* or 260*c* is conducting, the switch-initiating pulse SIP (row VII of Fig. 8) is applied at the terminal 254*b*. This pulse is positive in potential and is coupled via the conduit 146 to the grids of the row activator thyratrons 261*a*, 261*b* and 261*c* through respective capacitors 270*a*, 270*b* and 270*c***, respectively.

The switch-initiating pulse SIP causes the selected row switch thyratron **261*a* or 261*b* or 261*c* to conduct and causes the discharge of the pulse forming network $AL_{1c}$ through the appropriate printing lamp 150, 151 or 152** in this manner:

The printing lamps are enclosed spark discharge devices which will be described in detail subsequently. Each consists principally of an enclosed spark gap which will ionize and spark across when the difference in its electrode potentials exceeds a certain critical value.

In Fig. 3*c*, the total potential to which network $AL_{1c}$ is charged, is above the critical potential of any one of the printing lamps.

When the thyratrons **261*a*, 261*b*, 261*c* are in a non-conducting state, the resistors 271*a*, 271*b*, 271*c* and 276*a*, 276*b*, 276*c* divide the network potential so that the potential across each of the respective printing lamps 150, 151 and 152 is below its critical voltage. When one of the thyratrons 261*a*, 261*b* or 261*c* is made conducting, the associated resistor 276*a*, 276*b* or 276*c* is short circuited, and the whole potential (PL in row XII of Fig. 8) of the network $AL_{1c}$ is impressed across the gap of the associated printing lamp 150, 151 or 152 and it breaks down. A discharge circuit is thereby provided for the network $AL_{1c}$ which consists of one of the printing lamps 150, 151 or 152 and the thyratron 261*a*, 261*b* or 261*c* in series with it. Current of a high value flows from the high potential terminal of the network $AL_{1c}$ through the gap of the selected one of the printing lamps 150, 151 or 152, through the corresponding conduit 273*a*, 273*b* or 273*c* through the respective associated thyratron 261*a* or 261*b* or 261*c* to ground and thence back to the grounded side of the network $AL_{1c}$. The passage of current across the selected printing lamp gap produces a flash of light of the character required for satisfactory projection of the character on the rotating character disc onto the photo-sensitive film 18**.

The energy delivered to the selected printing lamp 150, 151 or 152 will begin abruptly, maintain an even rate of delivery to the lamp and end abruptly due to the characteristics of the pulse forming network $AL_{1c}$. This enables the production of a light of high intensity and of short time duration.

The discharge circuit of network $AL_{1c}$ includes the transformer 277 in series with its ground connection. The network discharge current flowing in transformer 277 causes a pulse of voltage to be developed across it. This voltage pulse is connected in series via a conduit 148 with the grid of the thyratron 262 along with its bias battery 278 and grid resistor 279. The pulse voltage is positive and great enough to cause conduction in thyratron 262. When thyratron 262 conducts, its cathode voltage rises to a relatively high value and is coupled to the cathodes of the thyratrons **260*a*, 260*b* or 260*c* through the condensers 267, 268*b* and 268*a*, respectively, so that whichever is conducting, is caused to become non-conducting by the circuit process which was previously explained. The row-selecting circuit is then returned to its initial state and ready for the next set of row-selecting signals. (Its initial state, it will be remembered, is that in which thyratron 262 is conducting and thyratrons 260*a*, 260*b* and 260*c*** are non-conducting.)

*The printing lamp*

(Figs. 5 and 6)

As described briefly above, each of the printing lamps 150, 151 and 152, which are identical in structure, is an enclosed spark discharge device in which passage of current between its electrodes produces the light. The lamp 150 is shown in detail in Figs. 5 and 6.

It has been shown by Mr. J. R. Haynes of the Bell Telephone Laboratories, Inc., that a spark discharge in hydrogen between electrodes, one of which is mercury or possibly another substance, produces a brilliant spot of light at the surface of the mercury electrode and a brilliant jet of light which emanates from the spot.

In Fig. 5 is shown in cross-section a printing lamp 150 which embodies such a gap. A glass envelope 280 encloses the two electrodes 281 and 282 in a hydrogen atmosphere. The electrode 281 is a solid metallic electrode connected to an external circuit, e. g., the conduit **273*a*, while the electrode 282 is a material such as porous iron saturated with mercury. The element 283 makes electrical connection to the electrode 282 for the purpose of connecting it to the external circuit, e. g., to the conduit 274. A metallic shield 284 acts as a condenser for the vaporized electrode materials and prevents the condensation of these vapors on the glass envelope 280. Such condensation on the glass envelope would render it opaque and reduce the useful light output from the lamp. A window 285 is provided in the metallic shield 284** for getting at the light source.

The printing lamp gap is shown in the act of sparking. The physical features of the spark are shown in detail in Fig. 6. 281 and 282 are the electrodes. 285' is the light spot on the surface of the mercury electrode 282 and 286 is the jet emanating from the spot. 287 is the ionized conducting column of hydrogen. Both the spot 285 and the jet 286 have a high unit brilliance. The brilliance of the hydrogen column 287 is relatively low. That of the spot 286 has been measured by Mr. Haynes and shown to be in the order of $10^6$ candles per square centimeter.

Haynes has also shown that the time duration of the spot 285 follows very closely that of the spark discharge current at time durations as short as one microsecond and that if a pulse of current of this nominal time duration is sent through the gap, a light pulse of the same nominal duration results. Also, it has been determined that the time duration of the light of the base of the jet 286 has roughly the same characteristics.

*Printing lamp optical system*

(Figs. 5 and 6)

By using the spot 285 and the base of the jet 286 an extremely rapid and brilliant light source is obtained for the machine of this invention.

Fig. 5 shows also the optical system 173 for gathering and condensing the light from the printing lamp 150. A lens 288 produces an image of the spot 285 and the jet 286 in a position 289. An iris 290 masks out the unwanted portions of the light from the jet which might be less rapid in action than required. A lens 291 diffuses the light from the image 289, producing a virtual image at 289*a* and the lenses 292 and 293 collect and direct the light through the character disc 16 to the first projection lens 179, whence, via the lens 176 (Fig. 2*a*) and mirror 182, the image on the disc 16 appearing at the proper time is projected onto the film 18 as previously described.

*Schematic diagram of the justifying circuits*

(Figs. 3*a* and 2)

Fig. 3*a* shows in schematic form the electronic circuits which provide for the automatic spacing of words to maintain an even right hand margin of the column, a process commonly referred to as "justifying."

The circuits in Fig. 3*a* are shown in flow diagram form in Fig. 2. Referring to Figs. 3*a* and 2, the elements in Fig. 3*a* corresponding to the blocks in Fig. 2 are as follows:

The diodes 294 and 295 and their associated components to be described correspond to the pulse counter 200 of Fig. 2.

The vacuum tube 296 and its associated components to be described correspond to the voltage generator 202 of Fig. 2.

The step relay 297 corresponds to the step relay 206 of Fig. 2.

The relay 298 corresponds to spacing selector 208 of Fig. 2.

The relay 299 and condensers 300 and 301 correspond to the spacing storage 212 of Fig. 2.

Thyratrons 302 and 303 and their associated components to be described correspond to the transfer relay 214 of Fig. 2.

The thyratron 304 and its associated components to be described correspond to spacing initiator 210 of Fig. 2.

The thyratron 305 and its associated components to be described correspond to switch 216 of Fig. 2.

Vacuum tubes 306 and 307 and their associated components to be described correspond to pulse generator 218 of Fig. 2.

The diodes 308 and 309 and associated components to be described correspond to the pulse counter 220 of Fig. 2.

Vacuum tube 310 and associated components to be described correspond to the comparator 222 of Fig. 2.

Vacuum tube 311 and associated components correspond to the amplifier 224 of Fig. 2.

Referring again to Fig. 3*a*, the antecedent character space pulses generated by cell 46 Fig. 3 and amplified by the amplifier 70 are connected via the conduit 198 to the terminal 312. These antecedent character space pulses are coupled to the diodes 294 and 295 through a capacitor or condenser 313. The amplifier 70 and condenser 313 are the pulse generator 199 of Fig. 2. The diodes 294 and 295 are so connected that upon the receipt of each pulse, the voltage upon the condenser 314 is caused to change by an incremental amount in the positive direction. The initial charge on the condenser 314 before the antecedent character space pulses are received is zero.

The vacuum tube 296 has its plate connected to a positive potential source (not shown). Connected in series with its cathode are the resistors 315 and 316 and connected to taps on these resistors is a battery 317. The tube 296 will allow current to flow through the cathode resistors 315 and 316 in such quantity as to cause the relative grid-to-cathode voltage to be maintained at a stable point. When the grid voltage increases due to the incremental increase of the charge on condenser 314, a corresponding increase in plate current and thereby cathode voltage will result. The voltage from cathode-to-ground of the tube 296 will bear an almost constant relationship to the voltage on the condenser 314.

Current from the battery 317 will flow through two parallel paths *a—b—e—d* and *a—c—f—d* provided by the cathode resistors 315 and 316. The voltage drops in the resistors 315 and 316 due to the current produced by the battery 317 do not affect the cathode-to-ground voltage of the tube 296. This is because of the bridge arrangement of the battery and resistors. Across the sections *a—c* and *e—d* of the resistors 315 and 316, the cathode and battery currents will be additive. Across the resistor sections *a—b* and *d—f* the currents will be subtractive.

In the machine of this invention, the current from the battery 317 is made relatively proportional to the column width to be printed. The cathode current of tube 296 is relatively proportional to the character spaces counted from the antecedent character space pulses by the diodes 294 and 295. The net current in the section *d—f* of resistor 316 is, therefore, relatively proportional to the difference between the column width and the character space, that is, the unfilled space of the lines being scanned by cell 46 Fig. 2. The voltage drop across section *d—f* of the resistor 316, being proportional to the current, bears the same relationship. We will refer to this voltage as the total space voltage.

A tapped resistor 318 is connected in parallel with the section *d—f* of the resistor 316. The contacts 297*a* of the step relay 297 are connected to the taps on resistor 318 as shown. The taps on the resistor 318 are so arranged that the voltage connected to the moving contact 297*b* of step relay 297 will be equal to the total space voltage divided by the number of steps the relay has advanced from the first step.

The operating solenoid 319 is connected through a terminal 320 to the conduit 204 from the amplifier 71 of the antecedent word space signals generated by the cell 47 of Fig. 2 from code characters 62 of the tape 10. These signals cause the step relay arm 297*b* of the step relay 297 to advance one step upon the receipt of each word space signal. The circuit is so arranged that the step relay will not respond to the automatic spacing initiating signal 64 of Fig. 3. The voltage delivered to contact A of the relay 298 is now relatively proportional to the space to be inserted between each word or group of characters.

There is connected to the contact B of the relay 298 a battery 321 whose voltage remains constant at a value which is relatively proportional to a predetermined standard spacing to be inserted between words. During the antecedent scanning of a line, the standard spacing voltage from the battery 321 will be connected to armature C of the relay 298 until an automatic spacing mark 64 is picked up by the cell 47 and a pulse generated therefrom. This pulse is transmitted along with the antecedent word space signals, to the terminal 320 (Fig. 3a). The spacing signal is coupled through a high pass filter consisting of a capacitor 322 and a resistor 323 to the grid of the thyratron 304. The high frequency components of the automatic spacing signal generated by the code mark 64 will pass through to the grid of this tube and initiate conduction within it while the low frequency components of the word space signal generated by code mark 62 will not. When the thyratron 304 is made conductive, the solenoid of the relay 298 will be energized by the cathode current of the thyratron 304 and its armature C will be connected to the contact A. The word space voltage from the step relay 297 will then appear on the armature C of the relay 298.

The condensers 300 and 301 connected to the armatures D and E respectively, of the transfer relay 299 may be connected to the armature C of the relay 298 by a conduit 213 or to the grid of a vacuum tube 311 by the conduit 225. When the armatures D or E are connected to the contacts F or I of the relay 299, the condensers 300 and 301 are charged to the spacing voltage appearing on the contact C of the relay 298. When armatures D or E of the relay 299 are connected to the contacts G or H, the storage voltage of these condensers is connected to the grid of vacuum tube 311. As can be seen from Fig. 3*a*, one condenser 300 or 301 is occupied in storing a charge whenever the other 301 or 300 is occupied in delivering a previously stored charge to the vacuum tube 311. The switching between the storing and delivering function is accomplished by the solenoids 324 and 325 of the relay 299. These solenoids are connected in series with the plates of the thyratrons 303 and 302, respectively, by the conduits 215.

The transfer operation of the relay 299 is controlled by line signals generated by the cell 48 from its amplifier 72 (Fig. 3) and connected via the conduit 231 to the terminal 326 of Fig. 3*a*. The thyratrons 302 and 303 have a circuit arrangement such that one is conducting while the other is non-conducting. The grids of these thyratrons 302, 303 are connected via the resistors $R_{27}$, $R_{28}$ to the negative pole of battery $B_{30}$ whose positive pole is connected to ground. The line signals from the terminal 326 are coupled to the grids of both the thyratrons through the condensers 327 and 328. When a line signal is received, the grid of the non-conducting thyratron 302 or 303 is raised in potential sufficiently to initiate conduction. When conduction starts in that tube its plate voltage is changed from a high positive potential to nearly ground potential. This change in voltage is coupled through condenser 329 to the plate of the previously conducting thyratron 303 or 302. This voltage change momentarily causes the relative plate to cathode voltage of the previously conducting thyratron 303 or 302 to become less than that necessary to sustain ionization. Ionization ceases and the tube is rendered non-conductive. As conduction is transferred from one thyratron to the other, the associated solenoids 324 and 325, respectively, are correspondingly energized and transfer the armatures D and E of the relay 299 accordingly.

Vacuum tube 311, the grid of which receives the spacing voltage via the conduit 225, has a circuit similar to that of the tube 296. That is, the voltage from cathode-to-ground bears a stable and constant relationship to the voltage from grid-to-ground. The cathodes of the vacuum tubes 311 and 310 are connected together via a conduit 223 so that a grid bias relatively proportional to the desired word space is applied to tube 310 by the operation of tube 311. The cathode of the tube 310 is also connected to a condenser $C_{20}$ which is also connected to ground. The cathode of tube 311 is also connected via a resistor $R_{30}$ to ground.

Word space signals initiated by the code marks 62 and generated by the cell 49 (Fig. 3) are connected from the amplifier 73 via the conduit 227 to the terminal 330 (Fig. 3*a*). This terminal 330 connects to the grid of the thyratron 305 through a low pass filter consisting of the retardation coil 331 and a resistor 332, which allows the low frequency components of the word space signals to pass. When a word space signal is received, the thyratron 305 is made conductive, completing the circuit between the cathode of the vacuum tube 306 and ground. The resistor 332 is connected to the negative side of a biasing battery $B_{31}$ whose positive terminal is connected to ground.

The vacuum tubes 306 and 307 and their associated component resistors 333, 334, 335, 336, 337 and condensers 338 and 339 constitute a self-oscillating multivibrating circuit (the pulse generator 218 of Fig. 2). This circuit is so arranged that when the cathode of the vacuum tube 306 is at ground potential, it will oscillate and produce pulses across the resistor 337. The pulses generated across resistor 337 are connected to the solenoid 188 (Figs. 3*a* and 3*b*) which, as previously described in connection with Fig. 3*b*, actuates the transverse translation mechanism 20, 187, etc.

The pulses generated across the resistor 337 are also connected via the conduit 219 through a condenser 340 to the pulse counting circuit 220 consisting of the diodes 308 and 309 and the condenser 341. These diodes are arranged in such a way that for each pulse delivered to them, the potential across the condenser 341 is increased by an incremental amount. The voltage on the condenser 341, in combination with the cathode voltage provided by the vacuum tube 311, establishes the grid bias of the vacuum tube 310. The vacuum tube 310 and its associated transformer 342 are connected in a blocking oscillator circuit. When the voltage on condenser 341 reaches such a value that the relative grid-to-cathode voltage of the vacuum tube 310 is within the plate current conducting region, plate current begins to flow and a single oscillation of short time duration is produced. During this oscillation, a voltage is induced in the winding E—F of the transformer 342 and is applied via the conduit 230 through the capacitor 343 to the plate of the switch 216 thyratron 305. This voltage is of such a nature as to cause the plate of the thyratron 305, which is also connected via the resistance $R_{31}$ to a source of positive potential (not shown) momentarily to assume a potential that is negative with respect to its cathode, thereby stopping plate current flow and ionization of the gas within the tube 305 and rendering the latter tube non-conductive. The rendering of thyratron 305 non-conductive causes the multivibrator circuit comprising the vacuum tubes 306 and 307 to stop generating pulses. The number of pulses this multivibrator has generated in the meantime, however, is the number which was predetermined by the cathode potential on the vacuum tube 310 and the number of unit spaces which it was determined should be inserted between the words.

The line signals connected to the terminal 326, in addition to causing the operation of the transfer relay 299, perform three circuit resetting functions to prepare the character spacing circuits for the next line of printing. Each line signal actuates the relay 344 which reduces the charge upon the capacitor 314 to zero; actuates the reset solenoid 345 of the step relay 297 which brings the traveling arm **297*b* back to the first contact 297*a*; actuates relay 346 which removes plate voltage from the thyratron 304 rendering it non-conductive and restoring the relay 298 to the unoperated position. The line signals also actuate the solenoid 193** (Figs. 3*a* and 3*b*) which allows the transverse translation mechanism 20 to be reset by the spring 191 to the beginning of a new line, and the solenoid 197 which actuates the longitudinal translation mechanism 28, 196 etc. The translation mechanisms and the character and word space circuits are now ready for another cycle of operation.

*Modifications of translation mechanisms*

(Fig. 10)

Modified transverse translation and longitudinal translation mechanisms are possible. For example, as shown in Fig. 10, the transverse translation mechanism mirror 182*a* which corresponds to the mirror 182 of Fig. 2*a* is supported on its shaft 185*a* so that when the mirror 182*a* is moved, the transverse of the point 21*a* across the width of the film 18*a* is not at 90° with the edges 22*a* and 23*a* of the film but at an angle other than 90°. The operating mechanism for the mirror 182*a*, however, is identical with that described for mirror 182. The relay 197 of Fig. 2*a* and ratchet 196*a* and pawl 196 of the longitudinal translation device of said Fig. 2*a* are, however, replaced by a constant speed motor 197*a* coupled through suitable gearing to the shaft of the reel 27*a*.

The traversing angle of the path of the spot 21*a* is such that its tangent is equal to the longitudinal space taken by one line to be printed divided by the width of the column line to be printed on film 18*a*. In this form of translation, the advancement rate of the film 18*a* is proportional to the transverse translation of spot 21*a*. Although the transverse translation is at a small angle, the printed line ends up perpendicular to the edges 22*a* and 23*a* of the film 18*a*. At the beginning of a new line to be printed, the transverse translating mechanism, as before, merely swings the mirror 182*a* back to reposition the spot 21*a* at the starting point. The film 18*a* in the meantime has been moved forward the distance required for the next line of printing to begin. No circuit changes are necessary other than elimination from Figs. 2*a*, 3*a* and 3*b* of the relay 197 and the conduits thereto.

*Other modifications remotely operated typecomposing machine*

(Fig. 11)

The correlation of the various parts of the invention that have been described will exist when the control signal pickups and the printing mechanisms are in close proximity to each other as shown in Fig. 1. However, the printing mechanism can be operated remotely from the tape and control signal generating mechanism, as seen in Fig. 11, by merely extending the electrical connections between the parts and providing for synchronizing the character disc motor 29*a* and the tape-driving mechanism 24*a*. Parts in Fig. 11 with identical reference characters but with the subscript *a* are identical with those of Fig. 1.

By the addition of suitable signal converters, a single wire or radio link may be made to serve as a connection between the control signal pickup and the printing mechanism. This additional apparatus is shown in Fig. 11. Signals from the synchronizing generator 39*a* and the control signal apparatuses 30*a* and 31*a* are fed into the signal converter 40*a* which, through a system of carrier modulation or other means, converts the multiple signals to a form that may readily be transmitted by a single wire circuit or by radio link 41*a*. At the printing machine location, another signal converter 42*a* receives the multiple signals transmitted by the single wire or radio link 41*a* and reconverts the control signals to their original state. The signal converter provides synchronizing signals to synchronize properly the printing driving motor 29*a* through the synchronizing control 43*a*. The tape feed mechanism 24*a* is controlled directly by the synchronizing generator 39*a*. The connections or paths 38, 33, 35 and 36 of Fig. 1 are eliminated when the tape and printing mechanisms are operated with the remote connections via link 41*a*.

*The communication machine*

(Fig. 12)

For message transmission applications, it may be desirable from the standpoint of simplicity not to use the automatic word spacing circuits herein described. In that case, the antecedent signal pickup 30 of Fig. 1 and parts of the translation control 32 of Fig. 1 which are associated with the automatic spacing function are not incorporated in the machine.

Fig. 12 shows the previously described apparatus further simplified for message transmission. All parts with identical reference characters and the subscript *b* correspond with like numbered parts in Fig. 1. In this modified system, the printing is applied in a continuous line to the sensitized tape 18*b* which is contained on the reel 25*b*. The sensitized tape 18*b*, after being exposed and processed, may be cut into segments of line length and attached to a message blank.

In this form of the invention, word spacing is not necessary to preserve even margins and, therefore, the antecedent signal pickup 30 of Fig. 1 is omitted. Also, in this form of the invention a transverse translation mechanism 20 of Fig. 1 is not needed and, therefore, it is omitted. Moreover, in this form of the invention the propelling of the sensitized tape 18*b* can be accomplished by a direct mechanical connection to the driving motor 29*b*. That is, for each revolution of the master type disc 16*b* the sensitized tape 18*b* will move one character space. Therefore, the longitudinal translation mechanism 28 of Fig. 1 is not essential and is omitted. The rotational motion of the driving motor 29*b* is converted into a suitable motion in the translation mechanism 28*b* and propels the sensitized tape 18*b* through the friction rollers 194*b* and 195*b*, one of which is driven by the motor 29*b*.

With continued reference to Fig. 12, the tape 10*b* containing the code is fed past a pickup section 13*b*, as previously described, where a printing signal pickup 31*b* converts the code on the tape 10*b* into signals which in turn are fed into the signal converter 40*b* for conversion into signals for wire or radio transmission. The tape feed mechanism 24*b* is controlled by a synchronizing generator 39*b*. A signal from the synchronizing generator 39*b* is also fed into the signal converter 40*b* for transmission via the link 41*b* to the remote receiving point. At the receiving point, the signals are reconverted by the signal converter 42*b*. The synchronizing signals are fed to the synchronizing control 43*b* which controls the driving motor 29*b* and the translation mechanism 28*b*.

The printing signals are fed into the printing control 34*b*. As previously described, the printing signals set up a key in the printing control 34*b* which, when matched by signals from the registering pickup 37*b* in turn generated from the printing disc 16*b*, cause the printing light 17*b* to light and the character 19*b* on the type disc 16*b* to be projected to the tape 18*b* as the printed character 21*b*. The driving motor 29*b* controls the advancement of the tape 18*b* through the translation mechanism 28*b* and the friction drive rollers 194*b* and 195*b*. All circuits with the exception of parts eliminated remain the same.

As can be seen from the foregoing description, this invention embodies a machine which is suitable for the rapid setting of type directly upon a sensitized material for offset printing. It is limited in rapidity of operation only by the rapidity of action of the electronic circuits and certain reciprocating mechanical elements employed. The mechanical elements are limited to operations requiring only a relatively slow operation and, therefore, do not present a severe deterrent to the speed.

The machine may be operated with its printing mechanism located at a distance from the code tape and control signal generating mechanism and the two may be connected by wire lines or by radio transmission links. This feature is particularly adaptable to publishing operations in which editorial offices are maintained in one city and a printing plant in another city or another part of the same city. In this situation, the copy will be prepared along with the code tape and the proof read at the editorial offices. The control signal portion of the machine will be located at the editorial offices and connected to the printing portion of the machine at the printing plant by wire line or radio link. The copy at the editorial office may then be directly converted into set type at the printing plant at a very rapid rate of speed. The printing speed is estimated at 300 words per minute minimum.

Of particular importance in the machine is its ability to "justify" the individual lines of type to maintain even margins. The automatic method of justifying eliminates all manual work in connection with the process.

In the communications field, the invention offers a more rapid means of transmitting messages and particularly one which will enable a greater degree of security from unauthorized reception. In the process of converting the control signals for radio or wire transmission, the different code groups may be periodically interchanged and mixed with spurious code signals so that only the receiving station knowing in advance the key to the interchanging and the spurious code signals may satisfactorily receive the transmission.

In addition to the typecomposing and communication applications of the invention herein described, it is believed that it has other fields of usefulness. For instance, such a machine with some modifications might be used to address envelopes where large quantities of envelopes are addressed from a mailing list. The mailing list in this case would be permanently retained in the reel of coded tape. The address labels or envelopes would be prepared with a coating of light-sensitive material to receive the photographic printing and the envelopes fed appropriately at the printing point under the spot 21, 21*a* or 21*b* and subsequently developed out.

While preferred embodiments and modifications have been described, variations in structural detail, in electronic and other circuits and manner of use are possible and are contemplated within the scope of the claims. There is no intention, therefore, of limitation to the exact details shown and described.

I claim:

1. A machine of the character described comprising photo-sensitive means onto which characters of printed matter are to be projected for exposure, coded means including a tape having code elements respectively denoting character signals, character space signals, word space signals, line signals, sector, subsector and sub-subsector and row selecting signals, scanning means for said elements, and means for transmitting signals generated by said scanning means, character bearing means, code elements denoting sector, subsector and sub-subsector registering signals on said bearing means, said code elements being in fixed positional relationship to the characters on said bearing means, scanning means for said last named code elements and means for transmitting signals generated by said last named scanning means, an electronic sector comparator for receiving signals via respective transmitting means generated respectively by the sector selecting and sector registering elements, an electronic subsector comparator for receiving signals via respective transmitting means generated respectively by the subsector selecting and subsector registering elements, an electronic sub-subsector comparator for receiving signals via respective transmitting means generated respectively by the sub-subsector selecting and sub-subsector registering elements, electronic pulse generators connected respectively one to each of said sector, subsector and sub-subsector comparators, the pulse generator connected to the sub-subsector comparator also being connected to provide a gating action for the subsector comparator, and the pulse generator connected to the subsector comparator also being connected to provide a gating action for the sector comparator whereby the sub-subsector, subsector and sector comparators can act only in succession in the order named and the pulse generator connected to the sector comparator can act only after the sector comparator has been actuated, said last named pulse generator then delivering a switch initiating pulse, electronic row switches connected to said last named pulse generator for receiving said switch initiating pulse, electronic row activators connected to said row switches and receiving row selecting signals generated by the row signal element of said tape to activate only a selected one of said electronic row switches in conjunction with said switch initiating impulse, and printing lights one connected to each of said row switches adapted to be energized only upon actuation of its row switch, means for projecting light from the energized of said printing lights through the selected character on said character bearing means onto said photosensitive means and means responsive to the character space signal elements, word space signal elements and line signal elements to position the projected light and selected characters as required by the code elements upon said sensitized material.

2. A machine of the character described comprising photo-sensitive material onto which characters of printed matter are to be projected for exposure comprising means bearing characters for projection onto said photo-sensitive material, said characters being arranged in groups, printing lights individual to said groups for projecting selected of the characters onto said photo-sensitive material, independent switching means for each printing light to activate a selected one of said printing lights for projecting a selected character of a selected group onto said photo-sensitive material, control means, electronic gate pulse generators connected for actuation by said control means, means connecting the pulse generators for operation in sequence so that the gate pulse of each pulse generator in turn is required to actuate the succeeding pulse generator, and a final switch initiating electronic pulse generator activated only upon actuation of the last preceding gate pulse generator, said switch initiating gate pulse generator being connected to all of said switching means and a portion of said control means also being connected to all of said switching means whereby a selected one of said switching means is activated by said switch initiating pulse to activate its associated printing light and project a character from a selected group upon said material.

3. A device as per claim 2 in which translation control mechanism for positioning the projected characters at desired locations on said photo-sensitive material are provided and in which said control means is connected to said translation control mechanisms to activate the latter for proper positioning of said projected characters on said photo-sensitive material.

4. A device as per claim 2 in which longitudinal and transverse translating mechanisms for positioning the projected characters at desired locations on said photo-sensitive material are provided and in which said control means is connected to each of said translation control mechanisms to activate the latter for proper positioning of said projected characters on said photo-sensitive material.

5. A device as per claim 4 in which said longitudinal and transverse translating mechanisms comprise electronic elements and associated electric circuits and in which said control means comprises photo-electric scanning means.

6. A device as per claim 2 in which said control means comprises photo-electric scanning means connected to said pulse generators and a tape bearing element for scanning by said scanning means.

7. A device as per claim 5 in which electronic elements and associated electric circuits connect said scanning means to respective of said pulse generators.

8. A device as per claim 2 in which said character bearing means includes code elements and photo-electric scanning means for said code elements and electronic elements and associated electric circuits for connecting said electronic elements to respective of said pulse generators.

9. In combination, a rotatable character bearing member, said member having at least one portion carrying indicia representative of the positions of said characters and having another portion, means for continuously rotating said rotatable member, projector means disposed to project characters carried by said rotatable member, a record strip carrying indicia representative of characters, scanning means for scanning said record strip indicia, and record strip advancing means for moving said record strip in timed relation wtih said rotatable member to effect scanning of said record strip by said scanning means during the movement of said another portion of the rotatable member past said projector means.

10. In phototypographic apparatus, the combination of a record strip bearing indicia representative of characters, first means for scanning said record strip indicia and providing electrical pulses corresponding thereto, a rotatable member carrying indicia representing characters, means for scanning certain of said rotatable member character indicia to produce electrical signals corresponding thereto, first electronic counter means for providing a voltage representative of the pulses produced by said first means, second electronic counter means for providing a voltage representative of the electrical signals corresponding to said rotatable member character indicia, blocking oscillator means comprising an electron tube having a plate electrode, a grid electrode connected to receive the output of said first counter means and a cathode connected to receive the output of said second counter means, means connected in the plate-cathode circuit of said tube for producing an electrical pulse when a predetermined relation between the outputs of said first and second counters obtains, and electrical means responsive to said last named electrical pulse for applying a voltage to said first counter means to restore it to a reference condition.

11. In phototypographic apparatus, the combination of a record strip bearing indicia representative of characters, first means for scanning said record strip indicia and providing electrical pulses corresponding thereto, a rotatable character-bearing member having one portion carrying indicia representing the positions of the characters thereon and having another portion carrying control indicia, means for scanning certain of said rotatable member character position indicia and control indicia to produce distinguishable electrical signals corresponding thereto, respectively, first electronic counter means for providing a voltage representative of the pulses produced by said first means, second electronic counter means for providing a voltage representative of the electrical signals corresponding to said rotatable member character indicia, blocking oscillator means comprising an electron tube having a plate electrode, a grid electrode connected to receive the output of said first counter means and a cathode connected to receive the output of said second counter means, means connected in the plate cathode circuit of said tube for producing an electrical pulse when a predetermined relation between the outputs of said first and second counters obtains, each of said pulses being indicative of a particular position of said rotatable member, electrical means responsive to said last named electrical pulse for applying a voltage to said first counter means to restore it to a reference condition, and means responsive to an electrical signal corresponding to said rotatable member control indicia for applying a voltage to said second counter means to restore it to a reference condition.

12. In phototypographic apparatus, the combination of a rotatable member having one portion carrying indicia representative of the positions of characters thereon and having another portion carrying control indicia, means for scanning said character and control indicia to provide distinguishing electrical signals corresponding thereto, respectively, said character and control indicia being selected to provide electrical signals having different time rates of change, electronic counter means responsive only to said character indicia signals, and means responsive only to said control indicia signals for applying a voltage to said counter means to restore it to a reference condition.

13. In phototypographic apparatus, the combination of a record strip bearing character representative indicia, a rotatable member carrying indicia representative of characters, first means for scanning certain of said record strip indicia to produce first electrical pulses corresponding thereto, second means for scanning certain of said rotatable member indicia to produce second electrical pulses corresponding thereto, means responsive to a predetermined relation between said first and second pulses for producing a gating pulse, third means for scanning other of said record strip indicia to produce third electrical pulses corresponding thereto, fourth means for scanning other of said rotatable member indicia and rendered operative by said gating pulse to produce fourth electrical pulses corresponding to said rotatable member other indicia, and means responsive to a predetermined relation between said third and fourth electrical pulses for producing a second gating pulse.

14. In a phototypographic system, the combination of a record strip bearing indicia severally representative of character spaces and of word spaces, first means for scanning said character space indicia to produce electrical pulses corresponding thereto, electronic counter means for producing a first voltage proportional to the number of said pulses, means for providing a second voltage representative of the difference between a standard voltage having a magnitude corresponding to a line of characters of standard length and said first voltage, and adjustable voltage dividing means responsive to said word space indicia on the record strip for dividing said difference voltage by the number of word spaces in a line to provide a justifying voltage representing the correct spacing to be inserted between words to print characters in justified lines.

15. In a phototypographic system, the combination of a record strip bearing automatic justifying indicia and indicia severally representative of character spaces and of word spaces, first means for scanning said character space indicia to produce electrical pulses corresponding thereto, electronic counter means for producing a first voltage proportional to the number of said pulses, means for providing a second voltage representative of the difference between a standard voltage having a magnitude corresponding to a line of characters of standard length and said first voltage, adjustable voltage dividing means responsive to said word space indicia on the record strip for dividing said difference voltage by the number of word spaces in a line to provide a justifying voltage representing the correct spacing to be inserted between words to print characters in justified lines, a source of voltage representing a standard word spacing, and means responsive to said automatic justifying indicia on the record strip for selecting either said justifying voltage or said standard voltage.

16. In a phototypographic system, the combination of a record strip bearing automatic justifying indicia and indicia severally representative of character spaces and of word spaces, first means for scanning said character space indicia to produce electrical pulses corresponding thereto, electronic counter means for producing a first voltage proportional to the number of said pulses, means for providing a second voltage representative of the difference between a standard voltage having a magnitude corresponding to a line of characters of standard length and said first voltage, adjustable voltage dividing means responsive to said word space indicia on the record strip for dividing said difference voltage by the number of word spaces in a line to provide a justifying voltage representing the correct spacing to be inserted between words to print characters in justified lines, a source of voltage representing a standard word spacing, means responsive to said automatic justifying indicia on the record strip for selecting either said justifying voltage or said standard voltage, means for printing characters in succession along a line, and means initiated by word space indicia on said record strip and controlled by said selected justifying voltage or said standard voltage for controlling the operation of said printing means to print characters in justified lines.

17. In phototypographic apparatus, the combination of a photosensitive strip, projector means for projecting characters on said strip, a rotatable reflector for controlling the locations of projected characters on said strip, a record strip carrying indicia representative of character spaces and line endings, means responsive to said character space indicia for advancing said reflector, means responsive to said line ending indicia for restoring said reflector to a reference position, and means responsive to said line ending indicia for advancing said photosensitive strip.

18. In phototypographic apparatus, the combination of a record strip carrying automatic justifying code indicia and word space code indicia, common scanning means for scanning said respective indicia to produce distinguishable signals corresponding thereto, said respective indicia being so formed as to produce signals having different time rates of change, spacing selector means responsive only to signals representative of said automatic justifying code indicia, and switching means responsive only to signals representative of said word space code indicia.

19. In phototypographic apparatus, the combination of a plurality of projector means, a plurality of switching means for operating said respective projector means, a plurality of actuators for said respective switches, first code controlled means for activating one of said actuators to prepare one of said switching means for operation, second code controlled means for actuating said prepared switching means to operate the corresponding projector means, and means responsive to said second code controlled means for restoring said activated actuator to a reference condition upon operation of one of said projector means.

20. In phototypographic apparatus, the combination of a rotatable member carrying characters and control indicia thereon, photosensitive means, a plurality of projector means for exposing said photosensitive means to selected characters on said rotatable member, said projectors being arranged to image characters at a common image position on said photosensitive means, a plurality of electron tube switches for operating said respective projector means, a plurality of electron tube actuators for actuating said respective switches, a record strip bearing control indicia and indicia representative of characters, first electron tube means responsive to control indicia on said record strip for rendering a selected one of said actuators operative to prepare the corresponding switch for operation, and electron tube means cooperatively responsive to indicia on said record strip and on said rotatable member for actuating said prepared switching means to operate the corresponding projector means.

21. In combination, a transmitter comprising a record strip bearing indicia representative of characters, first scanning means for scanning said record strip indicia to produce electrical signals corresponding thereto, motive means for advancing said record strip, electrical means for generating synchronizing signals in synchronism with the advancement of said record strip, signal converter means responsive to said record strip indicia signals and to said synchronizing signals for converting the same to signals capable of transmission over relatively long distances, a receiver comprising signal converter means for deriving record strip indicia electric signals and synchronizing signals from said transmission signals, a transmission channel connecting said transmitter signal converter means to said receiver signal converter means, a rotatable character bearing member having thereon indicia representative of characters, means responsive to said derived synchronizing signals for rotating said member in synchronism therewith, second scanning means for scanning said rotatable member indicia, photosensitive means, and means responsive to a predetermined relation between said derived record strip indicia electric signals and the output of said second scanning means for exposing said photosensitive means to a character on said member.

22. In combination, a transmitter comprising a record strip bearing indicia representative of characters, first scanning means for scanning said record strip indicia to produce electrical signals corresponding thereto, motive means for advancing said record strip, electrical means for generating synchronizing signals in synchronism with the advancement of said record strip, signal converter means responsive to said record strip indicia signals and to said synchronizing signals for converting the same to signals capable of transmission over relatively long distances, a receiver comprising signal converter means for deriving record strip indicia electric signals and synchronizing signals from said transmission signals, a transmission channel connecting said transmitter signal converter means to said receiver signal converter means, a rotatable character bearing member having thereon indicia representative of characters, means responsive to said derived synchronizing signals for rotating said member in synchronism therewith, second scanning means for scanning said rotatable member indicia, photosensitive means, and means responsive to a predetermined relation between said derived record strip indicia electric signals and the output of said second scanning means for exposing successive elements of said photosensitive means to characters on said member.

23. In phototypographic apparatus, the combination of a record strip bearing indicia representative of characters, first means for scanning said record strip indicia and providing electrical pulses corresponding thereto, a rotatable member carrying indicia representing characters, means for scanning certain of said rotatable member character indicia to produce electrical signals corresponding thereto, first electronic counter means for providing a voltage representative of the pulses produced by said first means, second electronic counter means for providing a voltage representative of the electrical signals corresponding to said rotatable member character indicia, blocking oscillator means comprising an electron tube having a plate electrode, a grid electrode connected to receive the output of said first counter means and a cathode connected to receive the output of said second counter means, and means connected in the plate-cathode circuit of said tube for producing an electrical pulse when the number of pulses counted by said second counter means is one more than the number of signals counted by said first counter means.

24. In phototypographic apparatus, the combination of a rotatable character-bearing member divided into a plurality of sectors, subsectors and elements and having character position-indicating indicia associated with said sectors, subsectors and elements, a record strip having indicia corresponding to said rotatable member sector, subsector and element indicia, respectively, for each character represented thereon, first means for scanning said record strip to produce sector, subsector and element electrical pulses for each character, second means for scanning said rotatable member sector indicia to produce electrical pulses corresponding thereto, means responsive to a predetermined relation between said rotatable member sector pulses and said record strip sector pulses for generating a first gating pulse equal in time duration to the time required for the passage of a sector of said rotatable member past a reference point, third means for scanning said rotatable member subsector indicia and rendered operative by said first gating pulse to produce electrical pulses corresponding thereto, means responsive to a predetermined relation between said rotatable member subsector pulses and said record strip subsector pulses for generating a second gating pulse equal in time duration to the time required for the passage of a subsector of said rotatable member past a reference point, fourth means for scanning said rotatable member element indicia and rendered operative by said second gating pulse to produce electrical pulses corresponding thereto, and means responsive to said rotatable member element pulses and said record strip element pulses for generating an actuating electrical pulse indicative of a particular position of said rotatable member.

25. In phototypographic apparatus, the combination of a record strip bearing indicia representative of characters, first means for scanning said record strip indicia and providing electrical pulses corresponding thereto, a rotatable member carrying indicia representing characters, means for scanning certain of said rotatable member character indicia to produce electrical signals corresponding thereto, first electronic counter means for providing a voltage representative of the pulses produced by said first means, second electronic counter means for providing a voltage representative of the electrical signals corresponding to said rotatable member character indicia, blocking oscillator means comprising an electron tube having a plate electrode, a grid electrode connected to receive the output of said first counter means and a cathode connected to receive the output of said second counter means, means rendering said blocking oscillator effective to compare the outputs of said first and second counters, means connected in the plate-cathode circuit of said tube for producing an electrical pulse when a predetermined relation between the outputs of said first and second counters obtains, and means initiated upon the production of said pulse for rendering said blocking oscillator temporarily ineffective to respond to electrical signals representative of said rotatable member character indicia.

26. A machine of the character described, comprising means for supporting a photo-sensitive recording medium upon which lines of characters are to be recorded, an optical system including at least one printing light, a character bearing member having thereon images of the various characters to be reproduced, said character bearing member being disposed between said printing light and said supporting means and movable to bring said images successively into position in which they can be projected upon a recording medium carried by said supporting means, means for moving said character bearing member continuously in a repetitious path to bring said images repeatedly into said position, electron tube counting means for registering the instantaneous position of said member, control signal apparatus adapted to register successive code signals corresponding to a desired succession of character images to be recorded upon said medium, and circuits controlled jointly by said position registering means and said control signal apparatus for energizing said printing light to record said desired succession of character images upon said medium.

27. A machine in accordance with claim 26, including translation means for directing the projected images of said successive character images to predetermined different positions on said medium to control the spacing therebetween, and translation control means forming a part of said control signal apparatus for controlling the operation of said translation means.

28. A machine in accordance with claim 27, including means for registering a value proportional to the total amount of space on said recording medium which will be required to record the successive characters constituting one line to be thereafter recorded, means for calculating the difference between the last-named registration and a predetermined value corresponding to the desired uniform length of lines to be recorded, and means for modifying the action of said translation control means in accordance with the calculated difference to cause the recorder line to occupy the desired space on said medium.

29. In a system for selecting any one of a plurality of stations each spaced a different distance from a reference point, signal generating means for providing an input signal indicative of a desired station, said input signal having a value which is a function of the interval between the desired station and the reference point, station selector means, means for establishing relative movement between the station selector means and the said stations, means for measuring the accumulated interval between the reference point and the station selector means, and control means cooperatively responsive to the accumulated interval measuring means and to said input signal for actuating said station selector means.

30. In a system for selecting any one of a plurality of stations each spaced a different distance from a reference point, a first signal generating device for providing an input signal representative of a station to be selected, said signal having a value representative of the interval between the said reference point and the desired station, station selector means, means for establishing relative movement between the selector means and the reference point, second signal generating means responsive to relative movement between the selector means and the reference point for generating a second signal cumulatively representative of the interval therebetween, and control means responsive to a predetermined relationship between the first and second signals for actuating said station selecting means.

31. In a system as set forth in claim 29, said control means for actuating the station selector means including storage means for storing a value representative of the input signal during the interval of relative movement between the reference point and the station selector means.

32. In a system as set forth in claim 30, said first and second signal generators being constructed and arranged to provide first and second signals in the form of variable counts, and said control means for actuating the station selector means including counter means responsive to a predetermined total count from both signal generators to actuate said station selecting means.

33. Composing apparatus comprising means for selecting successively desired characters from among a plurality of characters on a member moving cyclically relatively to a reference point, said member being controlled and arranged to define a predetermined time interval between character selecting cycles, control means for providing control signals representative of characters to be selected, first and second code elements movable with said member, means responsive to the first code elements for actuating the control means during the said time interval, means for storing values representative of the signals from the control means, means responsive to the second code elements during the movement of the characters relatively to the reference point for providing second code signals, and character selecting means responsive to a predetermined relationship between the stored value and the value of the signal derived from the second code elements.

34. A phototypographic apparatus comprising: a character carrying member; an optical projection system; a photosensitive surface for receiving images of characters projected from said character member by said optical projection system; a control strip; electronic character selecting circuits responsive to said control strip for selecting and controlling the projection of selected characters to the photosensitive strip; justifying means responsive to said control strip for computing and storing justifying values for a line of composed characters in antecedence to its composition; and character spacing means responsive to said control strip for altering said projection system to space the selected characters on said photosensitive strip in accordance with the respective set widths of such characters and for additionally spacing such characters in accordance with selected word space values.

35. A phototype printing machine comprising photosensitive means onto which type characters of printed matter are to be projected for exposure, type character font bearing means, projection means for the type characters of the font from said bearing means onto said photosensitive means, coded control means, electronic scanning means for scanning said coded control means, line justifying means connected to and under the control of said scanning means, electronic interpreting means connected to said scanning means for interpreting signals from said coded control means and selecting the characters of the type font on said bearing means to be projected and for operating said projection means to project the required of said printed matter characters on said photosensitive means as designated by said coded control means in justified lines.

36. In phototypographic apparatus, the combination of a record strip bearing indicia representative of characters, first means for scanning said record strip indicia and providing electrical pulses corresponding thereto, a movable member carrying indicia representing characters, means for scanning certain of said movable member character indicia to produce electrical signals corresponding thereto, first electronic counter means for providing and storing a count representative of the pulses produced by said first means, second electronic counter means for providing and storing a count representative of the electrical signals corresponding to said movable member character indicia, and electron tube means for producing an electrical pulse when a predetermined relation between the outputs of said first and second counters obtains.

37. A photographic composing machine comprising: a record strip; a carrier for characters as transparencies; means to support a light sensitive surface; optical projection means for projecting images of the character transparencies to the light sensitive surface; stepwise rotatable reflector means for displacing the projected character images relative to the light sensitive surface by amounts equal to the variable set widths of the respective character images; and means controlled by said record strip intermittently to actuate said rotatable reflector means, to project successive characters in spaced condition across said light sensitive surface.

38. A photographic composing machine comprising: a record strip; a carrier for characters as transparencies; means for supporting a light sensitive surface; optical projection means for projecting images of the character transparencies to the light sensitive surface; rotatable reflector means for displacing the projected character images step by step relative to the light sensitive surface by amounts equal to the variable set widths of the respective character images; indexing mechanism controlling the position of said mirror; electromagnetic means operating said indexing mechanism; and electronic pulsed circuits under the control of said record strip for controlling said electromagnetic means.

References Cited in the file of this patent

UNITED STATES PATENTS

| | | |
|---|---|---|
| 581,815 | Eaton | May 4, 1897 |
| 1,632,163 | Belin | June 14, 1927 |
| 1,647,408 | Hunter | Nov. 1, 1927 |
| 1,732,049 | Hunter | Oct. 15, 1929 |
| 1,805,333 | Hunter | May 12, 1931 |
| 1,893,158 | Chireix et al. | Jan. 3, 1933 |
| 1,933,650 | Bascom | Nov. 7, 1933 |
| 2,059,222 | Fressenden | Nov. 3, 1936 |
| 2,059,562 | Curtis | Nov. 3, 1936 |
| 2,067,182 | Green | Jan. 12, 1937 |
| 2,067,183 | Green | Jan. 12, 1937 |
| 2,077,490 | Paris | Apr. 20, 1937 |
| 2,180,417 | Huebner | Nov. 21, 1939 |
| 2,203,437 | Levy | June 4, 1940 |
| 2,275,017 | McNaney | Mar. 23, 1942 |
| 2,283,383 | McNaney | May 19, 1942 |
| 2,295,000 | Morse | Sept. 8, 1942 |
| 2,298,666 | Whitelaw | Oct. 13, 1942 |
| 2,321,581 | Conover | June 15, 1943 |
| 2,329,137 | Richards | Sept. 7, 1943 |
| 2,345,668 | Hallmark | Apr. 4, 1944 |
| 2,346,251 | Bryce | Apr. 11, 1944 |
| 2,351,126 | Highton | June 13, 1944 |
| 2,359,747 | Carleton | Oct. 10, 1944 |
| 2,364,188 | Bryce | Dec. 5, 1944 |
| 2,379,862 | Bush | July 10, 1945 |
| 2,379,880 | Burgess | July 10, 1945 |
| 2,388,961 | Elliott | Nov. 13, 1945 |
| 2,407,336 | Young | Sept. 10, 1946 |
| 2,409,689 | Morton | Oct. 22, 1946 |
| 2,409,698 | Lewis | Oct. 22, 1946 |
| 2,413,440 | Farrington | Dec. 31, 1946 |
| 2,440,283 | Levy | Apr. 27, 1948 |
| 2,443,195 | Pensyl | June 15, 1948 |
| 2,450,360 | Schoenfeld | Sept. 28, 1948 |
| 2,450,930 | Badclawski | Oct. 12, 1948 |
| 2,475,497 | Harrold et al. | July 5, 1949 |
| 2,495,296 | Springer | Jan. 24, 1950 |
| 2,503,765 | Rajchman et al. | Apr. 11, 1950 |
| 2,682,814 | Higonnet et al. | July 6, 1954 |
| 2,725,803 | Tansel | Dec. 6, 1955 |

FOREIGN PATENTS

| | | |
|---|---|---|
| 103,309 | Great Britain | Jan. 3, 1918 |
| 182,887 | Great Britain | July 7, 1922 |